United States Patent
Tsai et al.

(10) Patent No.: US 8,810,072 B2
(45) Date of Patent: Aug. 19, 2014

(54) HIGH-POWER INDUCTION-TYPE POWER SUPPLY SYSTEM AND ITS DATA TRANSMISSION METHOD

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 742 days.

(21) Appl. No.: 13/154,965

(22) Filed: Jun. 7, 2011

(65) Prior Publication Data

US 2011/0278949 A1 Nov. 17, 2011

(30) Foreign Application Priority Data

Feb. 1, 2011 (TW) .............................. 100103836 A

(51) Int. Cl.
*H01F 38/14* (2006.01)
*H02J 7/02* (2006.01)
*H02J 5/00* (2006.01)

(52) U.S. Cl.
CPC ...... *H02J 7/025* (2013.01); *H02J 5/005* (2013.01)
USPC .......................................................... 307/104

(58) Field of Classification Search
USPC .................. 307/104; 320/108; 713/300, 340; 455/573
See application file for complete search history.

(56) References Cited

U.S. PATENT DOCUMENTS

| 8,098,043 | B2 * | 1/2012 | Lin | 320/108 |
| 8,183,827 | B2 * | 5/2012 | Lyon | 320/108 |
| 8,217,535 | B2 * | 7/2012 | Uchida et al. | 307/104 |
| 8,217,621 | B2 * | 7/2012 | Tsai et al. | 320/108 |
| 8,248,024 | B2 * | 8/2012 | Yuan et al. | 320/108 |
| 8,358,103 | B2 * | 1/2013 | Eastlack | 320/108 |
| 8,373,387 | B2 * | 2/2013 | Bourilkov et al. | 320/108 |
| 8,412,963 | B2 * | 4/2013 | Tsai et al. | 713/300 |
| 8,417,359 | B2 * | 4/2013 | Tsai et al. | 700/22 |
| 8,541,975 | B2 * | 9/2013 | Park et al. | 320/108 |

* cited by examiner

*Primary Examiner* — Rexford Barnie
*Assistant Examiner* — Daniel Kessie
(74) *Attorney, Agent, or Firm* — Winston Hsu; Scott Margo

(57) ABSTRACT

A high-power induction-type power supply system includes a supplying-end module consisting of a supplying-end microprocessor, a power driver unit, a signal analysis circuit, a coil voltage detection circuit, a display unit, a power supplying unit, a resonant circuit and a supplying-end coil, and a receiving-end module consisting of a receiving-end microprocessor, a voltage detection circuit, a rectifier and filter circuit, an amplitude modulation circuit, a protection circuit breaker, a voltage stabilizer circuit, a DC-DC buck converter, a resonant circuit and a receiving-end coil. By means of single bit data analysis to start up power supply, sensing signal transmitting time during standby mode is minimized. Subject to asymmetric data signal data encoding and decoding system to recognize data code, power loss is minimized during synchronous transmission of power supply and data signal, and a high capacity of fault tolerance is achieved.

14 Claims, 24 Drawing Sheets

| bit | start | 1 | 2 | 3 | 4 | 5 | 6 | 7 | 8 | no signal |
|---|---|---|---|---|---|---|---|---|---|---|
| modulation status | modulation | no | modulation | no | modulation | no | modulation | no | modulation | no |
| length | 40 | 800 | 120 | 800 | 120 | 1200 | 30 | 1200 | 30 | |
| representative bit | start | 0 | 1 | 0 | 1 | 1 | 0 | 1 | 0 | | asymmetric length data transmission

HIGH-POWER INDUCTION-TYPE POWER SUPPLY SYSTEM AND ITS DATA TRANSMISSION METHOD

This application claims the priority benefit of Taiwan patent application number 100103836 file on Feb. 1, 2011.

BACKGROUND OF THE INVENTION

1. Field of the Invention

The present invention relates to power supply systems and more particularly, to a high-power induction-type power supply system and its data transmission method, which allows transmission of power supply and data signal at the same time with less power loss. By means of the supplying-end coil of the supplying-end module and the receiving-end coil of the receiving-end module, the system induces transmission of power supply and transmission of data signal, lowering power loss during transmission and enhancing wireless charging and data transmission performance.

2. Description of the Related Art

Following fast development of electronic and internet technology, many digitalized electronic products, such as digital camera, cellular telephone, multimedia player (MP3, MP4) and etc., have been continuously developed and have appeared on the market. These modern digital electronic products commonly have light, thin, short and small characteristics. However, for high mobility, power supply is an important factor. A mobile digital electronic product generally uses a rechargeable battery to provide the necessary working voltage. When power low, the rechargeable battery can be recharged. For charging the rechargeable battery of a digital electronic product, a battery charger shall be used. However, it is not economic to purchase a respective battery charger when buying a new mobile electronic product. Further, when one spends a big amount of money to purchase different mobile electronic products, a special storage space is necessary for the storage of the mobile electronic products. Further, it is inconvenient to carry and store many different mobile electronic products and the related battery chargers.

Further, when using a battery charger to charge a mobile electronic apparatus, the user must connect the connection interface (plug) of the battery charger to an electric outlet and then connect the connector at the other end of the battery charger to the mobile electronic apparatus, enabling the mobile electronic apparatus to be charged. After charging, the mobile electronic apparatus is disconnected from the battery charger. As conventional battery chargers must be used where an electric outlet is available, the application of conventional battery chargers is limited. When in an outdoor space, conventional battery chargers cannot be used for charging mobile electronic apparatuses.

Further, except battery charging, a mobile electronic apparatus may need to make setting of related functions, data editing or data transmission. A user may directly operate the mobile electronic apparatus to make function setting or to input data. However, some mobile electronic apparatus (such as MP3 player, MP4 player, digital camera, electronic watch, mobile game machine, wireless game grip, wireless controller) do not allow direct setting or data transmission. When making function setting or data transmission, an external electronic device (computer, PDA) must be used. Further, when charging a mobile electronic apparatus, it may be not operable to transmit data. Further, wireless induction power supply systems (or the so-called wireless chargers) are commercially available. These wireless induction power supply systems commonly use two coils, one for emitting power supply and the other for receiving power supply. However, the energy of wireless power supply is dangerous and will heat metal objects. They work like an electromagnetic stove. The use of a wireless induction power supply system has the risk of overheat damage of the charged device.

The prior art discloses a wireless charger data transmission method, which adopts asynchronous serial format that is a computer UART (universal asynchronous receiver/transmitter) format. This format is not specifically designed for induction type power supply system. In actual wireless charging operation, it has drawbacks as follows:

1. During signal modulation, resistive load is added to the receiving-end to reflect signal to the supplying-end coil. During signal generation period, the power of the receiving-end in receiving power supply from the supplying-end is interrupted. Further, when increasing the power during transmission of power supply, the power supply quality will be affected, causing charging instability.

2. When transmitting a data signal, data signal analysis is determined subject detection of current variation at the supplying-end coil. When the receiving-end is outputting power supply and the load has been changed, variation of the electric current at the supplying-end coil will occur. At this time, data code analysis will be affected due to output to the load, resulting in an incorrect data signal.

3. The power converting circuit and data transmission circuit at the receiving-end are of the same loop. When system power is enhanced, data transmission becomes unstable.

4. In order to sense the presence of the receiving-end during the standby mode, it is necessary to transmit a sensing signal that is much longer than one complete transmission data code. The longer the length of the sensing signal is the higher the consumption of power supply will be. Further, transmission of a sensing signal will heat the surrounding metal.

Therefore, it is desirable to a high-power induction-type power supply system that eliminates the problem of power loss of the prior art designs during charging, function setting or data transmission, and the problem of data signal interference during synchronous charging operation and data transmission.

SUMMARY OF THE INVENTION

The present invention has been accomplished under the circumstances in view. It is one object of the present invention to provide a high-power induction-type power supply system and its data transmission method, which allows synchronous charging operation and data transmission and has a high capacity of fault tolerance, minimizing power loss and assuring data signal transmission stability during synchronous charging operation and data transmission.

To achieve this and other objects of the present invention, the high-power induction-type power supply system comprises a supplying-end module and a receiving-end module. The supplying-end microprocessor of the supplying-end module has built-in data code analysis software that is capable of analyzing the data code of the data signal provided by the receiving-end module without affecting the operation of the supplying-end microprocessor in supplying power supply so that power loss is minimized during transmission of power supply. The receiving-end microprocessor of the receiving-end module is respectively electrically coupled with the amplitude modulation circuit, the protection circuit breaker and the voltage stabilizer circuit to control stable transmission of data signal subject to arrangement of time series so that the supplying-end microprocessor of the supplying-end module can recognize the data code of the received data signal to be correct or incorrect within a short period of time; by means of single bit data analysis to start up power supply, only a short period of time is used for transmitting a sensing signal when the supplying-end module is in the standby mode, and therefore standby power consumption of the supplying-end module is minimized.

Further, by means of the coil the supplying-end microprocessor of the supplying-end module voltage detection circuit, starts up the ADC (analog-to-digital converter) to match with the time series of frequency modulation, assuring operation stability of the high-power induction-type power supply system.

Further, subject to the asymmetric data signal data encoding and decoding transmission format design of the high-power induction-type power supply system, the supplying-end microprocessor of the supplying-end module enables the time in which the data signal is modulated to be greatly shortened, so that the time in which the supply of power supply to the receiving-end module is interrupted is shortened; by means of prolonging the interval between each two modulation status, the buffer capacitor of the buffer capacitor of the voltage stabilizer circuit of the receiving-end module can be fully charged for enabling the power output terminal to provide enhanced output power to the connected load, and therefore data code transmission is stabilized and power loss during transmission of power supply is minimized.

DETAILED DESCRIPTION OF THE PREFERRED EMBODIMENT

Figure 1:
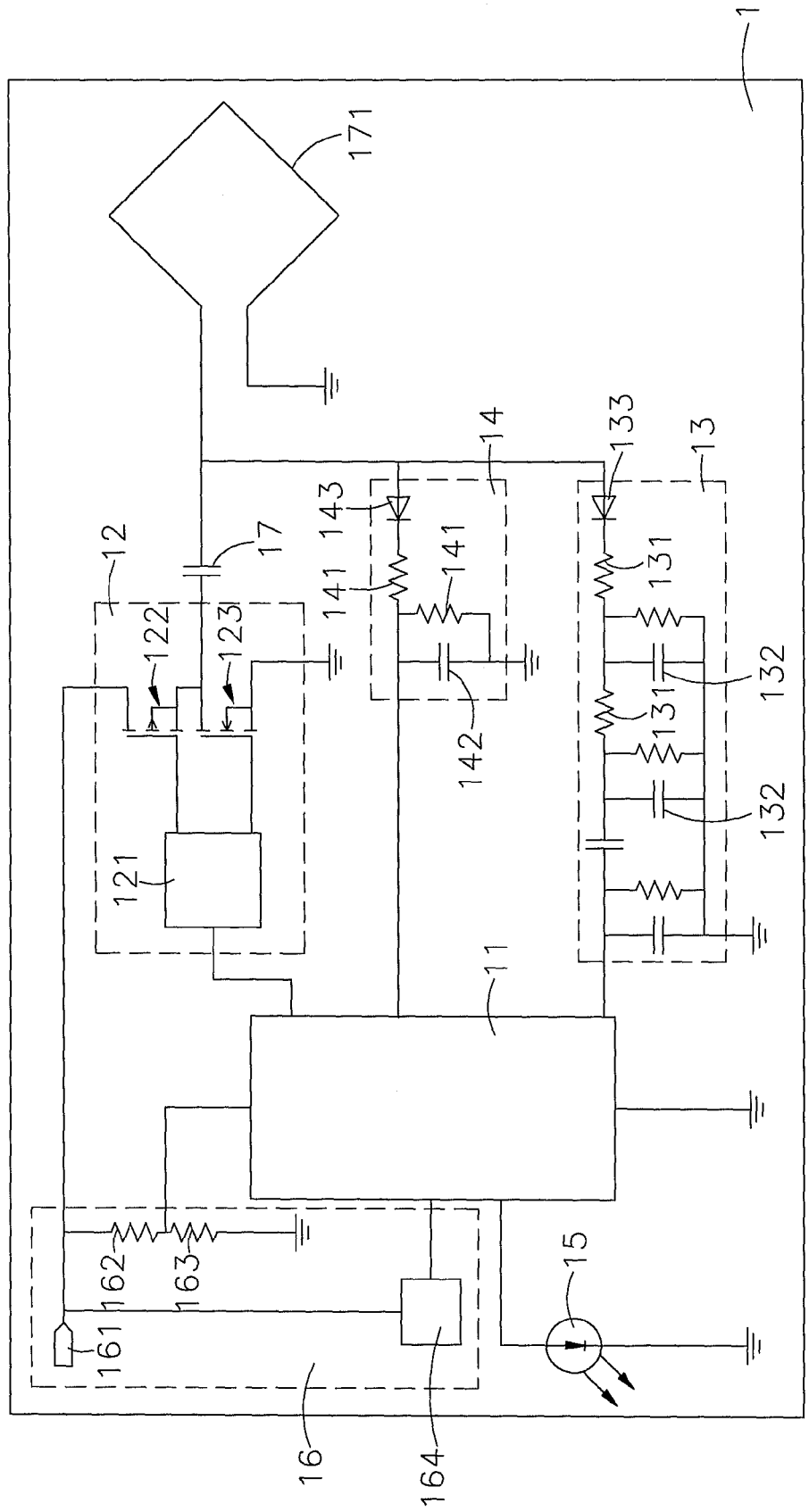
FIG. 1 is a circuit block diagram of a supplying-end module for high-power induction-type power supply system in accordance with the present invention.
Figure 2:
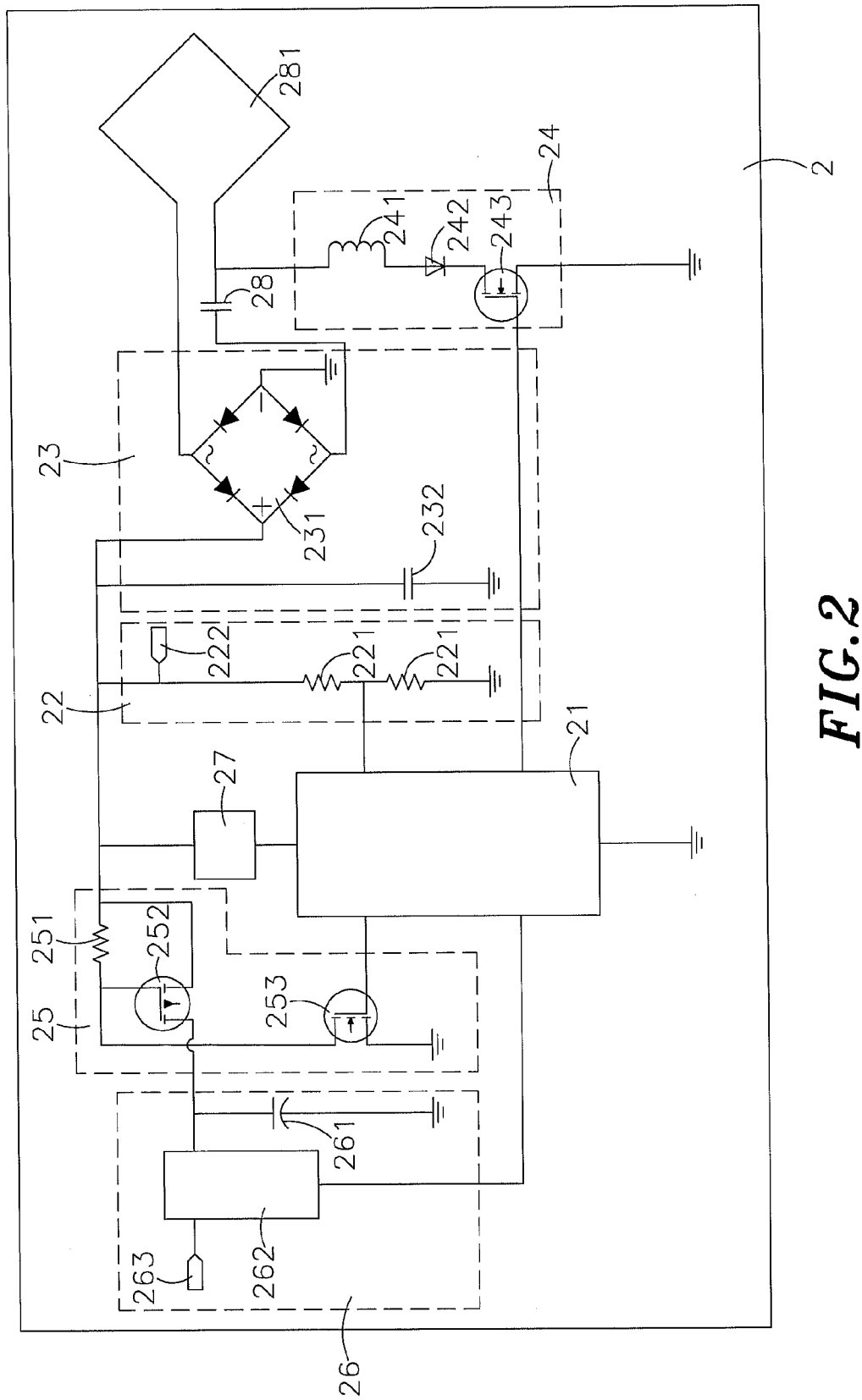
FIG. 2 is a circuit block diagram of a receiving-end module for high-power induction-type power supply system in accordance with the present invention.
Figure 3:
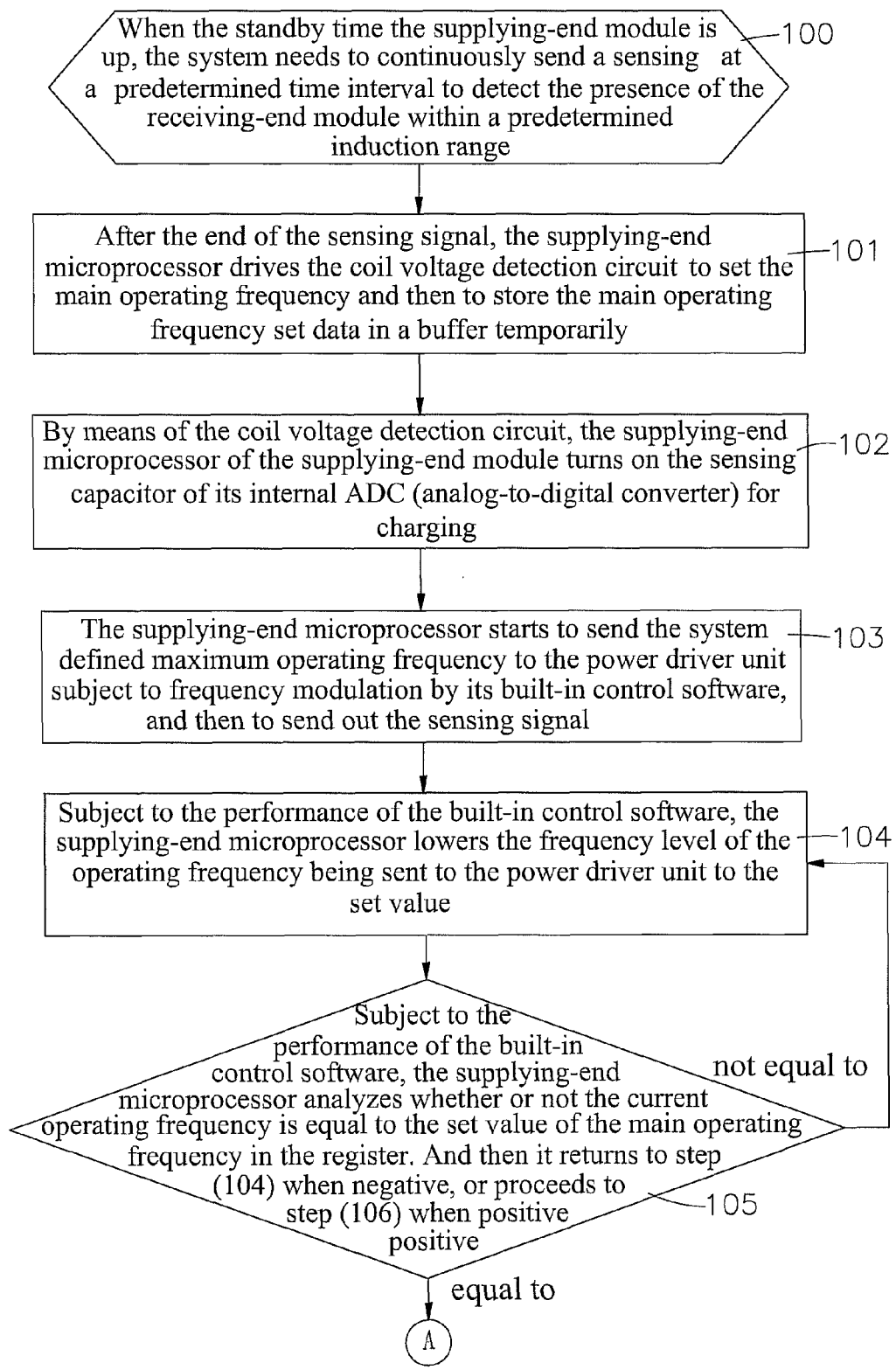
FIG. 3 is an operation flow chart of the supplying-end module of the high-power induction-type power supply system in accordance with the present invention (I).
Figure 4:
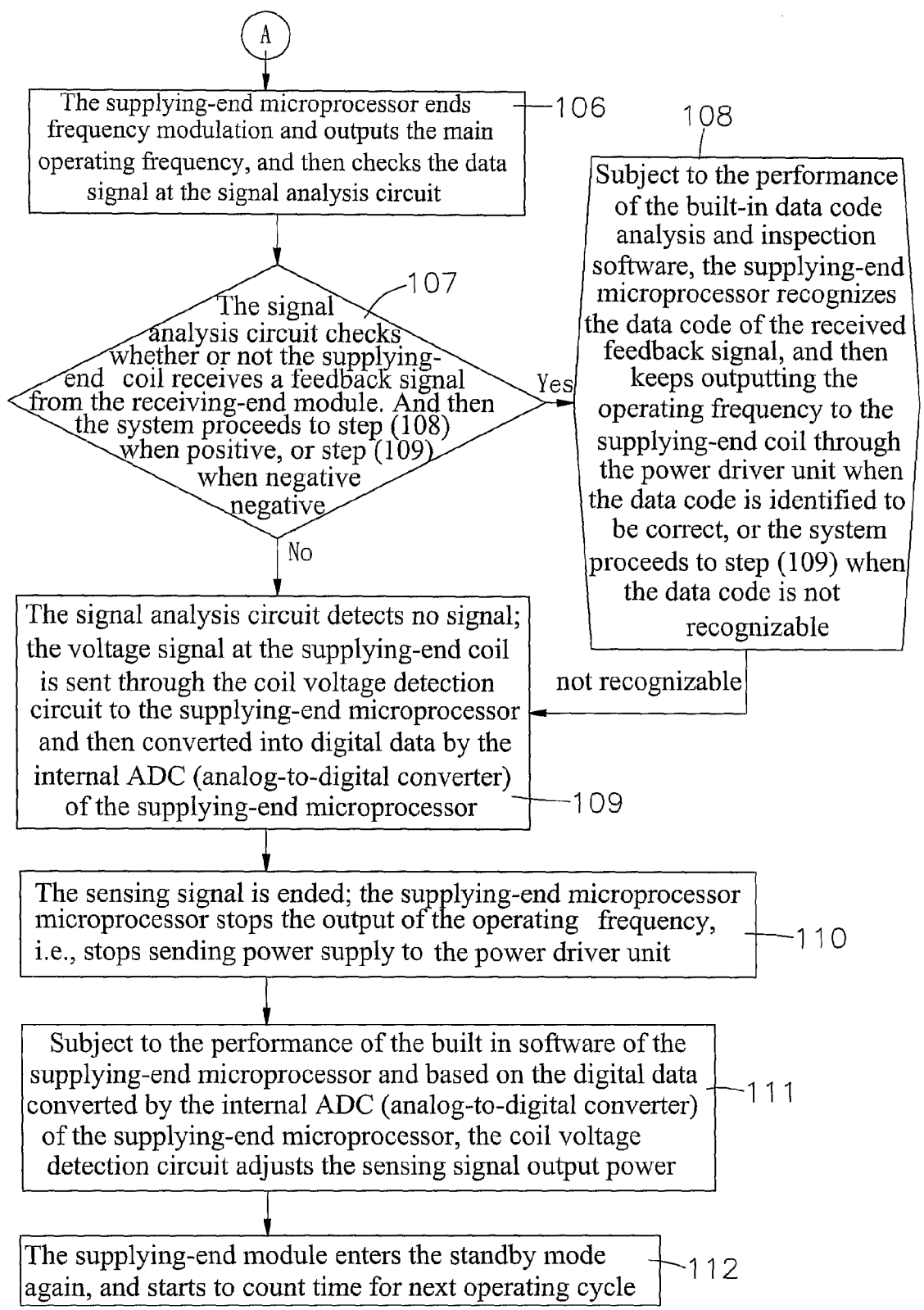
FIG. 4 is an operation flow chart of the supplying-end module of the high-power induction-type power supply system in accordance with the present invention (II).

Referring to FIGS. 1~4, a high-power induction-type power supply system is shown comprising a supplying-end module 1 and a receiving-end module 2.

The supplying-end module 1 comprises a supplying-end microprocessor 11 having installed therein an operation/control/data decoding and analysis-related software program, a power driver unit 12, a signal analysis circuit 13, a coil voltage detection circuit 14, a display unit 15, a power supplying unit 16, a resonant circuit 17 and a supplying-end coil 171. The power driver unit 12, the signal analysis circuit 13, the coil voltage detection circuit 14, the display unit 15 and the power supplying unit 16 are respectively electrically coupled to the supplying-end microprocessor 11. The power driver unit 12 comprises a MOSFET (Metal-Oxide-Semiconductor Field-Effect Transistor) driver 121, a high-end MOSFET component 122 and a low-end MOSFET component 123. The MOSFET driver 121 is electrically coupled with the supplying-end microprocessor 11, the high-end MOSFET component 122 and the low-end MOSFET component 123. The high-end MOSFET component 122 and the low-end MOSFET component 123 are respectively electrically coupled with the resonant circuit 17. The high-end MOSFET component 122 is also electrically coupled with the power supplying unit 16 and the resonant circuit 17. The signal analysis circuit 13 comprises a rectifier diode 133 electrically coupled with the resonant circuit 17, a series of resistors 131 electrically connected in series to the rectifier diode 133, and a plurality of capacitors 132 electrically connected in parallel to the series of resistors 131. The coil voltage detection circuit 14 comprises a rectifier diode 143 electrically coupled with the resonant circuit 17, a series of resistors 141 electrically connected in series to the rectifier diode 143, and the capacitors 142 electrically connected in parallel to the series of resistors 141. The power supplying unit 16 is also electrically coupled with the power driver unit 12, comprising a power source 161, two current sensing shunt resistors 162; 163 electrically connected in series to the power source 161, and a DC-DC buck converter 164 electrically connected to the power source 161. The supplying-end coil 171 is electrically coupled with the resonant circuit 17, and adapted for transmitting power supply and data signal wirelessly.

The receiving-end module 2 comprises a receiving-end microprocessor 21 having installed therein an operation/control-related software program, a voltage detection circuit 22, a rectifier and filter circuit 23, an amplitude modulation circuit 24, a protection circuit breaker 25, a voltage stabilizer circuit 26, a DC-DC buck converter 27, a resonant circuit 28 and a receiving-end coil 281. The voltage detection circuit 22, the rectifier and filter circuit 23, the amplitude modulation circuit 24, the protection circuit breaker 25, the voltage stabilizer circuit 26 and the DC-DC buck converter 27 are respectively electrically coupled with the receiving-end microprocessor 21. The voltage detection circuit 22 comprises a plurality of resistors 221 electrically connected in series to the receiving-end microprocessor 21, and sensing points 222 electrically connected with the resistors 221, the rectifier and filter circuit 23, the protection circuit breaker 25 and the DC-DC buck converter 27 in series. The rectifier and filter circuit 23 comprises a rectifier 231 and a filter capacitor 232 respectively electrically connected in parallel to the voltage detection circuit 22, the protection circuit breaker 25 and the DC-DC buck converter 27. The resonant circuit 28 and the receiving-end coil 281 are electrically connected in parallel to the rectifier 231 of the rectifier and filter circuit 23, and electrically connected with the amplitude modulation circuit 24 in series. The amplitude modulation circuit 24 comprises an inductor 241, a rectifying diode 242 and a MOSFET component 243. The inductor 241, the rectifying diode 242 and the MOSFET component 243 are electrically connected in series. The protection circuit breaker 25 comprises a resistor 251, a P-type MOSFET component 252 and an N-type MOSFET component 253. The resistor 251, the P-type MOSFET component 252 and the N-type MOSFET component 253 are electrically connected in series. Further, the N-type MOSFET component 253 is electrically coupled with the receiving-end microprocessor 21. The voltage stabilizer circuit 26 comprises a buffer capacitor 261, a DC-DC step-down converter 262 and a power output terminal 263. The P-type MOSFET component 252 is electrically connected with the buffer capacitor 261 and DC-DC step-down converter 262 of the voltage stabilizer circuit 26. The voltage detection circuit 22, the protection circuit breaker 25, the voltage stabilizer circuit 26 and the DC-DC buck converter 27 are respectively electrically coupled with the rectifier and filter circuit 23. The rectifier and filter circuit 23 and the amplitude modulation circuit 24 are respectively electrically coupled with the resonant circuit 28, which is electrically coupled with the receiving-end coil 281.

Subject to the functioning of the amplitude modulation circuit 24 and the protection circuit breaker 25, the receiving-end microprocessor 21 of the receiving-end module 2 achieves controls of data signal. Subject to the functioning of the voltage stabilizer circuit 26, the receiving-end microprocessor 21 stabilizes transmission of data signal. Further, during transmission of power supply, transmission of data code of data signal is stabilized subject to the performance of the built-in data analysis software program of the supplying-end microprocessor 11, and the related power loss is minimized. Further, any change of load current due to the use of the receiving-end module 2 in a different mobile electronic apparatus (such as, cell phone, PDA, notebook, digital camera, MP3 player, MP4 player, palmtop game machine, etc.) does not affect the data code analysis performance of the supplying-end microprocessor 11. Further, the receiving-end module 2 has its power conversion circuit and its data transmission circuit separately arranged for independent operation, enhancing system power transmission capability.

When operating the supplying-end module 1 and receiving-end module 2 of the high-power induction-type power supply system to transmit power supply and data signal to a predetermined electronic apparatus, the high-power induction-type power supply system runs subject to the following steps:

(100) When the standby time the supplying-end module 1 is up, the system needs to continuously send a sensing signal at a predetermined time interval to detect the presence of the receiving-end module 2 within a predetermined induction range.

(101) After the end of the sensing signal, the supplying-end microprocessor 11 drives the coil voltage detection circuit 14 to set the main operating frequency and then to store the main operating frequency set data in a buffer temporarily.

(102) By means of the coil voltage detection circuit 14, the supplying-end microprocessor 11 of the supplying-end module 1 turns on the sensing capacitor of its internal ADC (analog-to-digital converter) for charging.

(103) The supplying-end microprocessor 11 starts to send the system defined maximum operating frequency to the power driver unit 12 subject to frequency modulation by its built-in control software, and then to send out the sensing signal.

(104) Subject to the performance of the built-in control software, the supplying-end microprocessor 11 lowers the frequency level of the operating frequency being sent to the power driver unit 12 to the set value.

(105) Subject to the performance of the built-in control software, the supplying-end microprocessor 11 analyzes whether or not the current operating frequency is equal to the set value of the main operating frequency in the register. And then it returns to step (104) when negative, or proceeds to step (106) when positive.

(106) The supplying-end microprocessor 11 ends frequency modulation and outputs the main operating frequency, and then checks the data signal at the signal analysis circuit 13.

(107) The signal analysis circuit 13 checks whether or not the supplying-end coil 171 receives a feedback signal from the receiving-end module 2. And then the system proceeds to step (108) when positive, or step (109) when negative.

(108) Subject to the performance of the built-in data code analysis and inspection software, the supplying-end microprocessor 11 recognizes the data code of the received feedback signal, and then keeps outputting the operating frequency to the supplying-end coil 171 through the power driver unit 12 when the data code is identified to be correct, or the system proceeds to step (109) when the data code is not recognizable.

(109) The signal analysis circuit 13 detects no signal; the voltage signal at the supplying-end coil 171 is sent through the coil voltage detection circuit 14 to the supplying-end microprocessor 11 and then converted into digital data by the internal ADC (analog-to-digital converter) of the supplying-end microprocessor 11.

(110) The sensing signal is ended; the supplying-end microprocessor 11 stops the output of the operating frequency, i.e., stops sending power supply to the power driver unit 12.

(111) Subject to the performance of the built in software of the supplying-end microprocessor 11 and based on the digital data converted by the internal ADC (analog-to-digital converter) of the supplying-end microprocessor 11, the coil voltage detection circuit 14 adjusts the sensing signal output power.

(112) The supplying-end module 1 enters the standby mode again, and starts to count time for next operating cycle.

Figure 10:
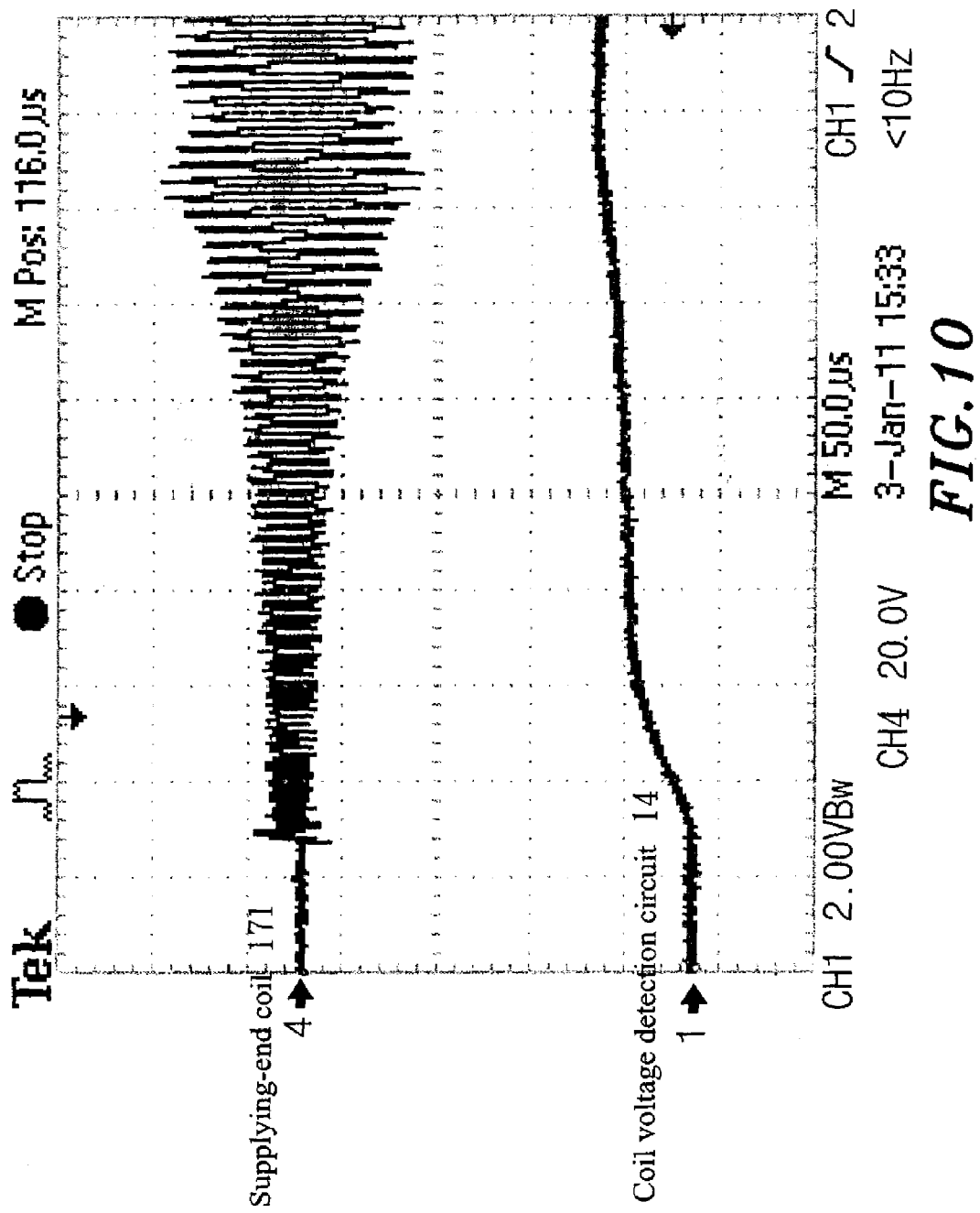
FIG. 10 illustrates one example of frequency modulation startup operation according to the present invention.
Figure 11:
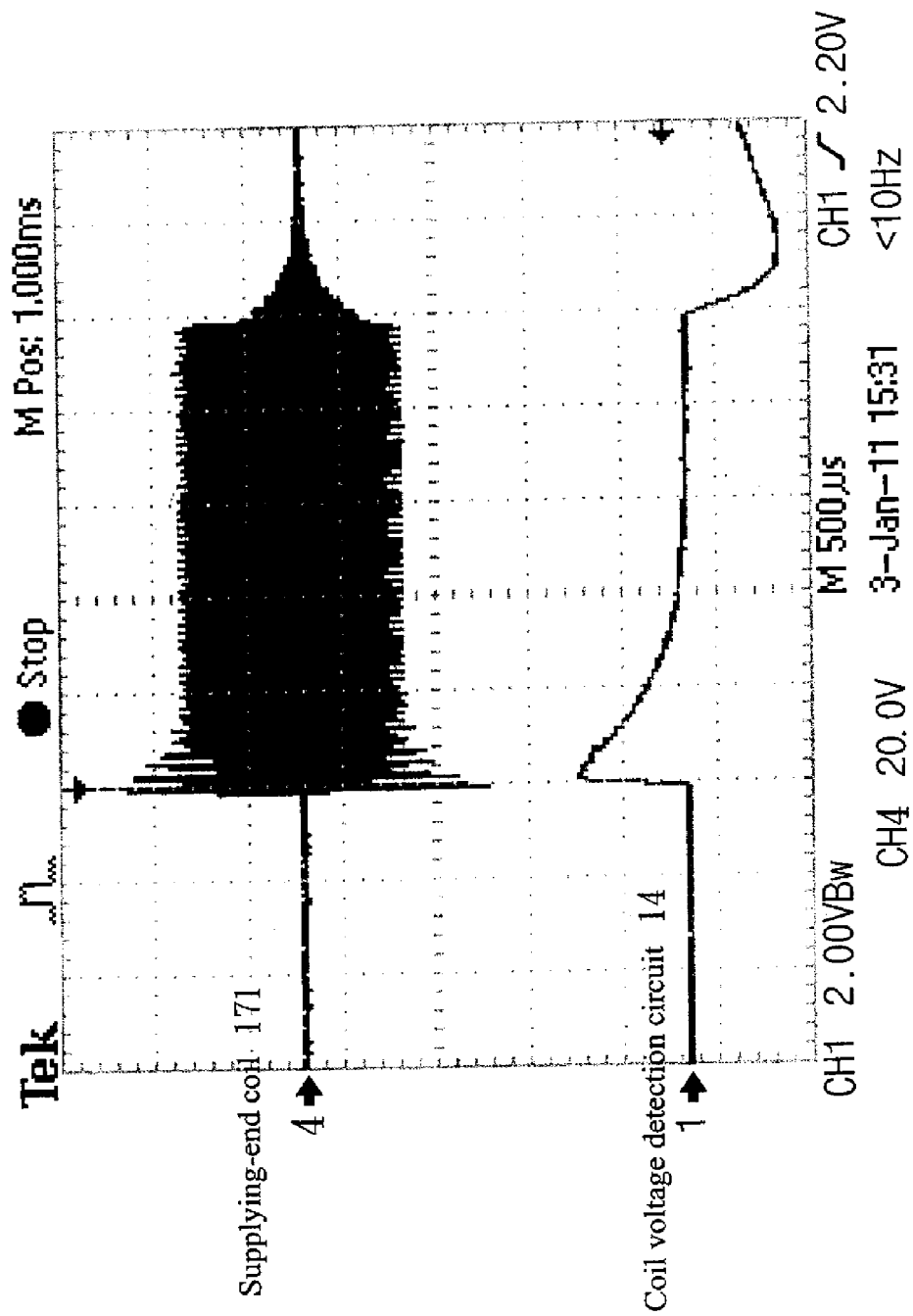
FIG. 11 illustrates another example of frequency modulation startup operation according to the present invention.
Figure 12:
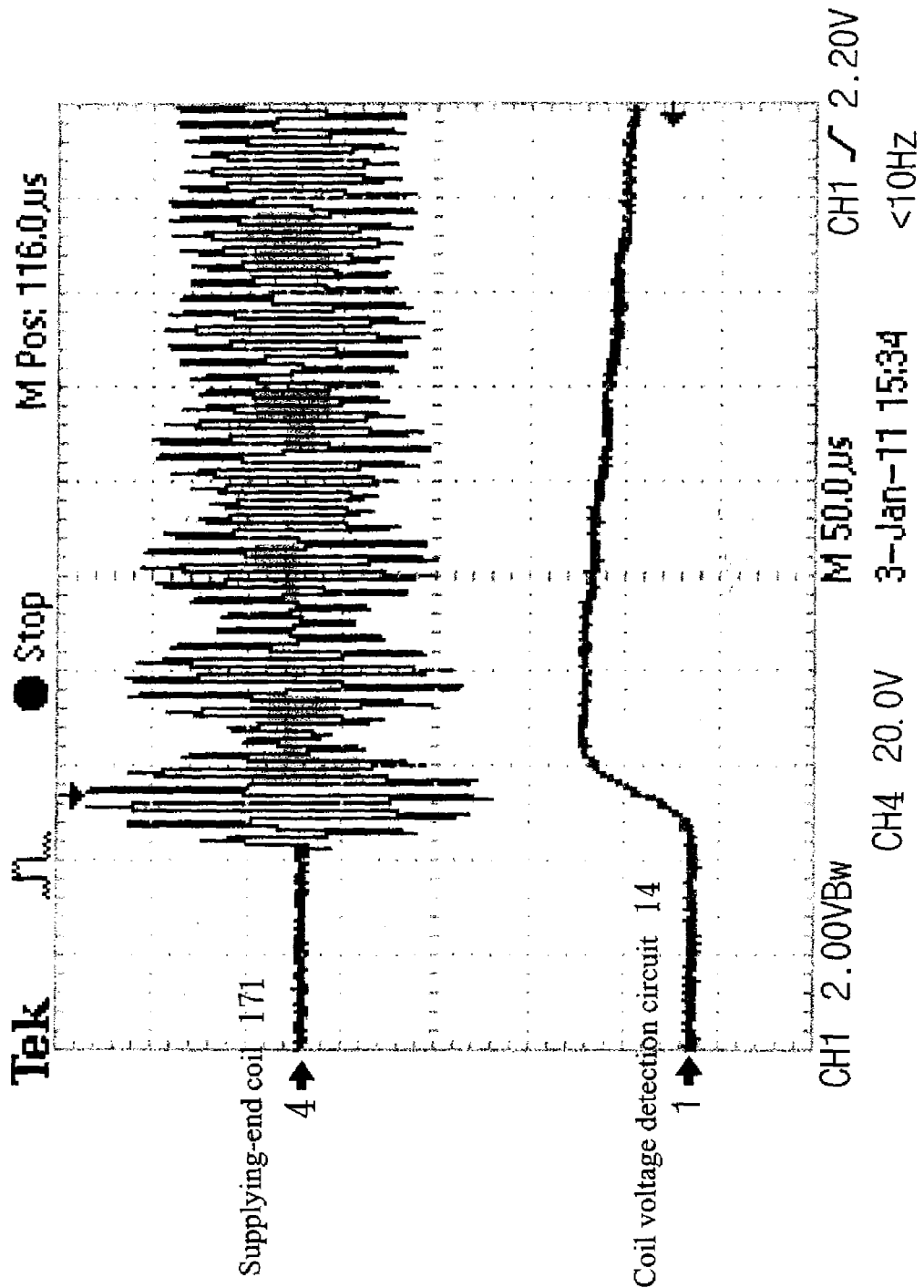
FIG. 12 illustrates still another example of frequency modulation startup operation according to the present invention.

When the supplying-end module 1 is in the standby mode, it sends the sending signal at a predetermined time interval, for example, at the time interval of 2.5 mS; by means of the coil voltage detection circuit 14, the supplying-end microprocessor 11 modulates the frequency (see FIG. 10) in such a manner that when the power driver unit 12 of the supplying-end module 1 is started, the system sends out the defined maximum frequency, and then the supplying-end microprocessor 11 lower the frequency value from the defined maximum frequency to the main operating frequency set through the coil voltage detection circuit 14. When reached the set main operating frequency, the supplying-end microprocessor 11 stops frequency modulation, avoiding a transient overvoltage oscillation and surge-related component damage when the supplying-end coil 171 is driven to work by the power driver unit (see FIGS. 11 and 12). Thus, the invention effectively eliminates the problem of EMI (electromagnetic interference) during operation.

Further, by means of the coil voltage detection circuit 14, the supplying-end microprocessor 11 of the supplying-end module turns on the sensing capacitor of its internal ADC (analog-to-digital converter) for charging. The sensing capacitor of the ADC of the supplying-end microprocessor 11 must be charged for a certain length of time to assure accurate voltage detection of the coil voltage detection circuit 14. As the signal sensing time is designed to be short, when the power-supply module 1 is started up, the ADC channel of the supplying-end microprocessor 11 must be opened for enabling the sensing capacitor to be charged before analog-to-digital signal conversion operation. At the final step of the flow in which the supplying-end module 1 senses a signal from the receiving-end module 2, the coil voltage detection circuit 14 is coupled to the ADC of the supplying-end microprocessor 11, enabling the ADC of the supplying-end microprocessor 11 to convert the analog data signal into a digital data signal.

Figure 5:
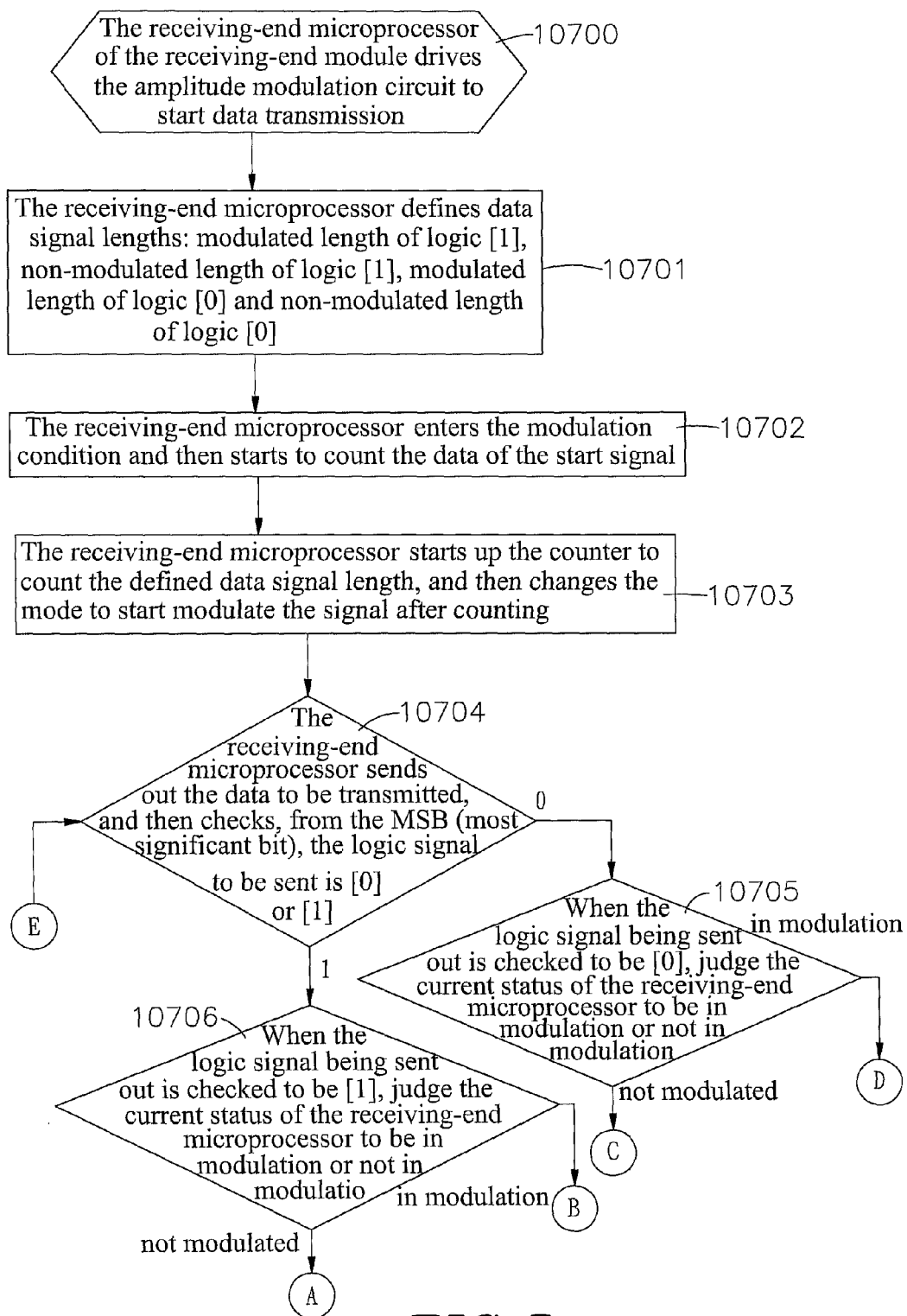
FIG. 5 is a flow chart data illustrating the data signal transmission operation of the receiving-end module of the high-power induction-type power supply system in accordance with the present invention (I).
Figure 6:
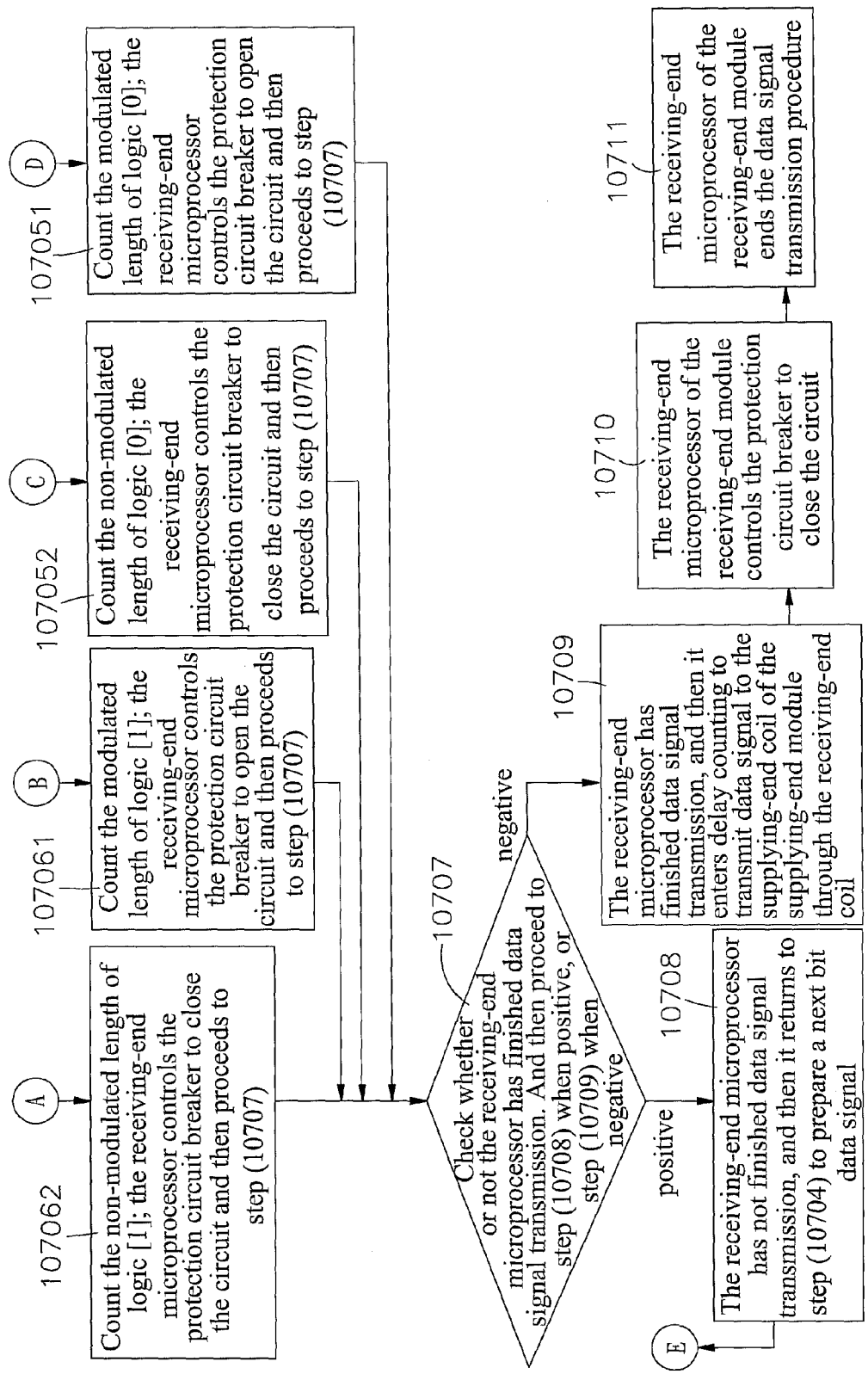
FIG. 6 is a flow chart data illustrating the data signal transmission operation of the receiving-end module of the high-power induction-type power supply system in accordance with the present invention (II).

Further, during the aforesaid step (107) where the signal analysis circuit 13 checks whether or not the supplying-end coil 171 receives a feedback signal from the receiving-end module 2, the amplitude modulation circuit 24 of the receiving-end module 2 drives the receiving-end coil 281 to transmit a feedback signal subject to the steps as below (see FIGS. 5 and 6).

(10700) The receiving-end microprocessor 21 of the receiving-end module 2 drives the amplitude modulation circuit 24 to start data transmission.

(100701) The receiving-end microprocessor 21 defines data signal lengths: modulated length of logic [1], non-modulated length of logic [1], modulated length of logic [0] and non-modulated length of logic [0].

(100702) The receiving-end microprocessor 21 enters the modulation condition and then starts to count the data of the start signal.

(100703) The receiving-end microprocessor 21 starts up the counter to count the defined data signal length, and then changes the mode to start modulate the signal after counting.

(100704) The receiving-end microprocessor 21 sends out the data to be transmitted, and then checks, from the MSB (most significant bit), the logic signal to be sent is [0] or [1], and then proceeds to step (10705) if it is [0], or step (10706) if it is [1].

(10705) When the logic signal being sent out is checked to be [0], judge the current status of the receiving-end microprocessor 21 to be in modulation or not in modulation, and then proceed to step (107051) if in modulation, or step (107052) if not in modulation.

(107051) Count the modulated length of logic [0]; the receiving-end microprocessor 21 controls the protection circuit breaker 25 to open the circuit and then proceeds to step (10707).

(107052) Count the non-modulated length of logic [0]; the receiving-end microprocessor 21 controls the protection circuit breaker 25 to close the circuit and then proceeds to step (10707).

(10706) When the logic signal being sent out is checked to be [1], judge the current status of the receiving-end microprocessor 21 to be in modulation or not in modulation, and then proceed to step (107061) if in modulation, or step (107062) if not in modulation.

(107061) Count the modulated length of logic [1]; the receiving-end microprocessor 21 controls the protection circuit breaker 25 to open the circuit and then proceeds to step (10707).

(107062) Count the non-modulated length of logic [1]; the receiving-end microprocessor 21 controls the protection circuit breaker 25 to close the circuit and then proceeds to step (10707).

(10707) Check whether or not the receiving-end microprocessor 21 has finished data signal transmission? And then proceed to step (10708) when positive, or step (10709) when negative.

(10708) The receiving-end microprocessor 21 has not finished data signal transmission, and then it returns to step (10704) to prepare a next bit data signal.

(10709) The receiving-end microprocessor 21 has finished data signal transmission, and then it enters delay counting to transmit data signal to the supplying-end coil 171 of the supplying-end module 1 through the receiving-end coil 281.

(10710) The receiving-end microprocessor 21 of the receiving-end module 2 controls the protection circuit breaker 25 to close the circuit.

(10711) The receiving-end microprocessor 21 of the receiving-end module 2 ends the data signal transmission procedure.

Figure 7:
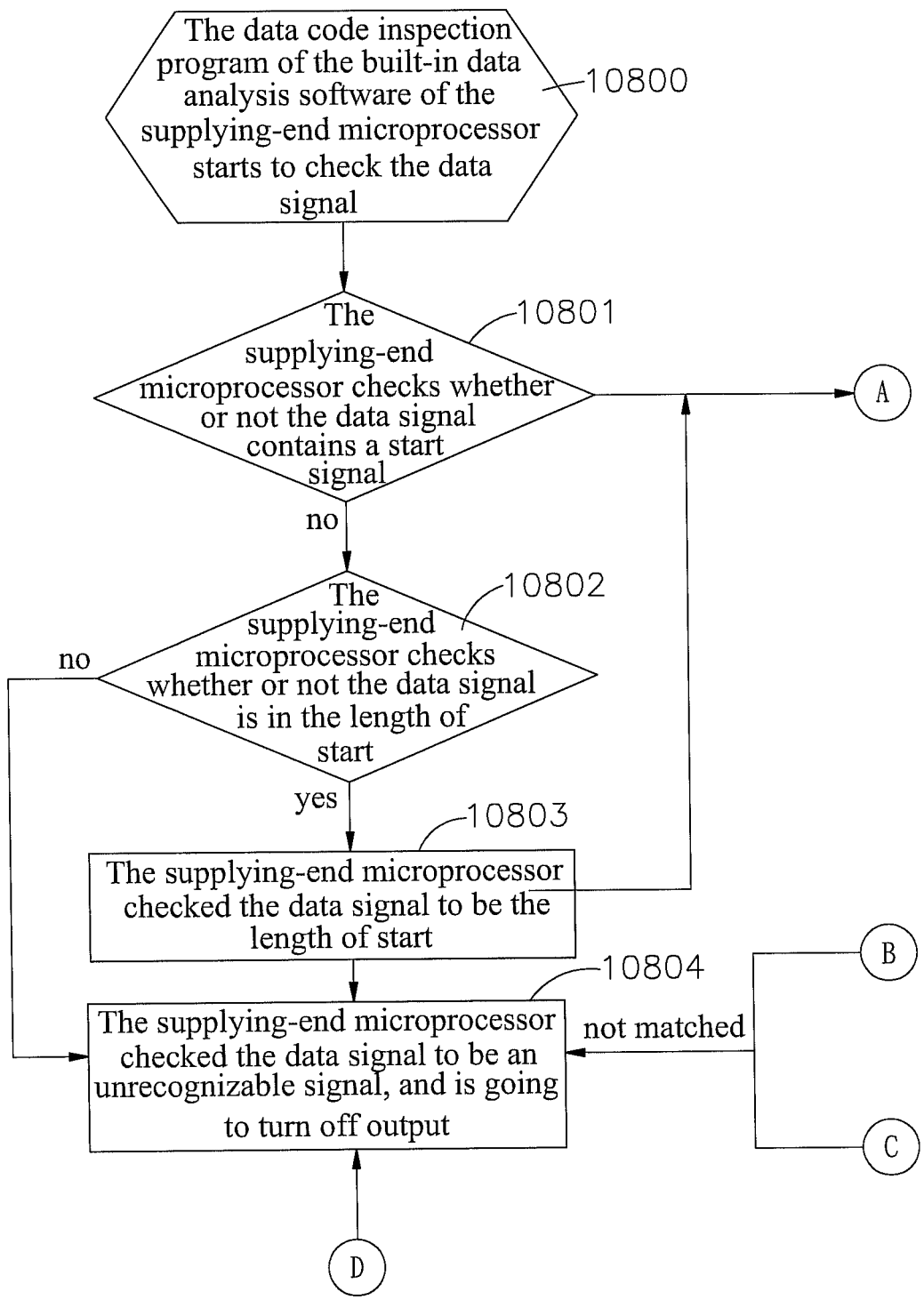
FIG. 7 is a flow chart illustrating the data code analysis operation of the supplying-end microprocessor of the supplying-end module of the high-power induction-type power supply system in accordance with the present invention (I).
Figure 8:
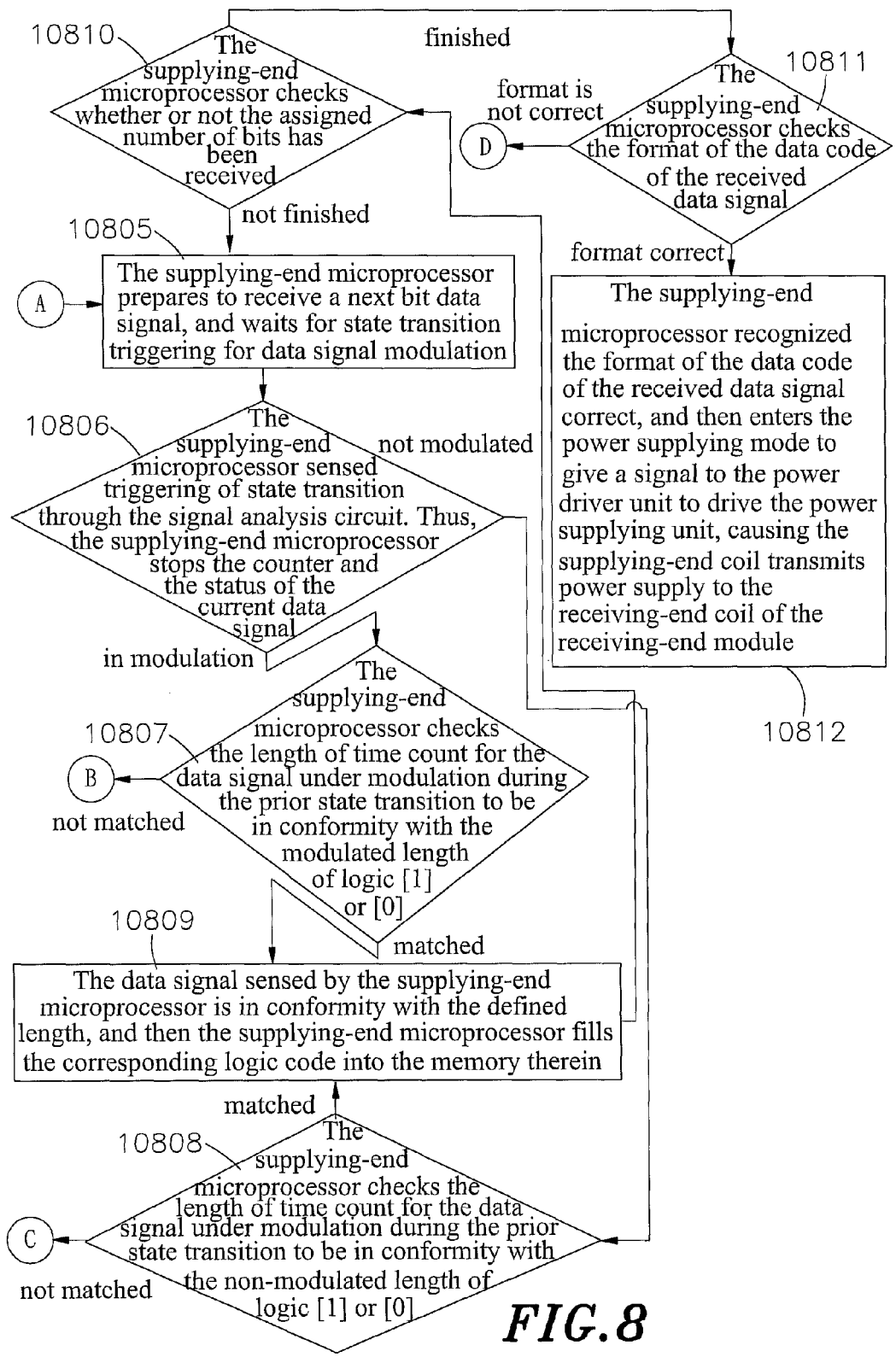
FIG. 8 is a flow chart illustrating the data code analysis operation of the supplying-end microprocessor of the supplying-end module of the high-power induction-type power supply system in accordance with the present invention (II).
Figure 9:
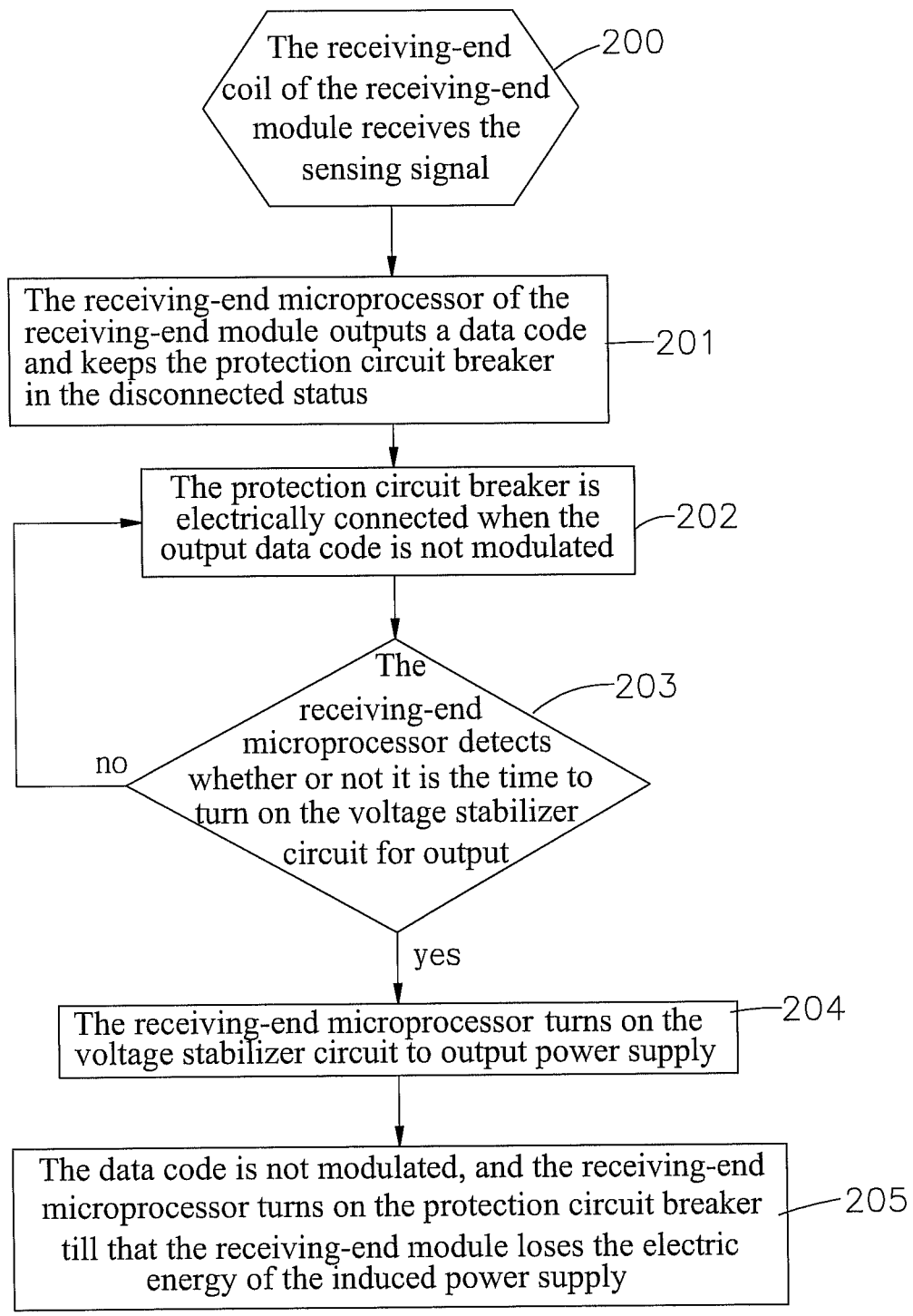
FIG. 9 is a flow chart illustrating the power output control operation of the receiving-end module of the high-power induction-type power supply system in accordance with the present invention.

Further, during the aforesaid step (108) where the supplying-end module 1 receives a feedback signal from the receiving-end module 2, the supplying-end microprocessor 11 recognizes the data code of the received feedback signal subject to the steps as below (see FIGS. 7 and 8).

(10800) The data code inspection program of the built-in data analysis software of the supplying-end microprocessor 11 starts to check the data signal.

(10801) The supplying-end microprocessor 11 checks whether or not the data signal contains a start signal. And then, the supplying-end microprocessor 11 proceeds to step (10802) when the data signal contains no start signal, or step (10805) when the data signal contains a start signal.

(10802) The supplying-end microprocessor 11 checks whether or not the data signal is in the length of start. And then, the supplying-end microprocessor 11 proceeds to step (10803) when the data signal is in the length of start, or step (10804) when the data signal is not in the length of start.

(10803) The supplying-end microprocessor 11 checked the data signal to be the length of start, and then proceeds to step (10805).

(10804) The supplying-end microprocessor 11 checked the data signal to be an unrecognizable signal, and is going to turn off output.

(10805) The supplying-end microprocessor 11 prepares receive a next bit data signal, and waits for state transition triggering for data signal modulation.

(10806) The supplying-end microprocessor 11 sensed triggering of state transition through the signal analysis circuit 13. Thus, the supplying-end microprocessor 11 stops the counter and judges the status of the current data signal, and then proceeds to step (10807) if the data signal is in modulation, or step (10808) if the data signal is not in modulation.

(10807) The supplying-end microprocessor 11 checks the length of time count for the data signal under modulation during the prior state transition to be in conformity with the modulated length of logic [1] or [0], and then proceeds to step (10809) when positive, or returns to step (10804) when negative.

(10808) The supplying-end microprocessor 11 checks the length of time count for the data signal under modulation during the prior state transition to be in conformity with the non-modulated length of logic [1] or [0], and then proceeds to step (10809) when positive, or returns to step (10804) when negative.

(10809) The data signal sensed by the supplying-end microprocessor 11 is in conformity with the defined length, and then the supplying-end microprocessor 11 fills the corresponding logic code into the memory therein.

(10810) The supplying-end microprocessor 11 checks whether or not the assigned number of bits has been received? And then, the supplying-end microprocessor 11 proceeds to step (10811) when positive, or returns to step (10805) when negative.

(10811) The supplying-end microprocessor 11 checks the format of the data code of the received data signal, and then, the supplying-end microprocessor 11 proceeds to step (10812) when the format is correct, or returns to step (10804) when not the format is not correct.

(10812) The supplying-end microprocessor 11 recognized the format of the data code of the received data signal to correct, and then enters the power supplying mode to give a signal to the power driver unit 12 to drive the power supplying unit 16, causing the supplying-end coil 171 transmits power supply to the receiving-end coil 281 of the receiving-end module 2.

Figure 13:
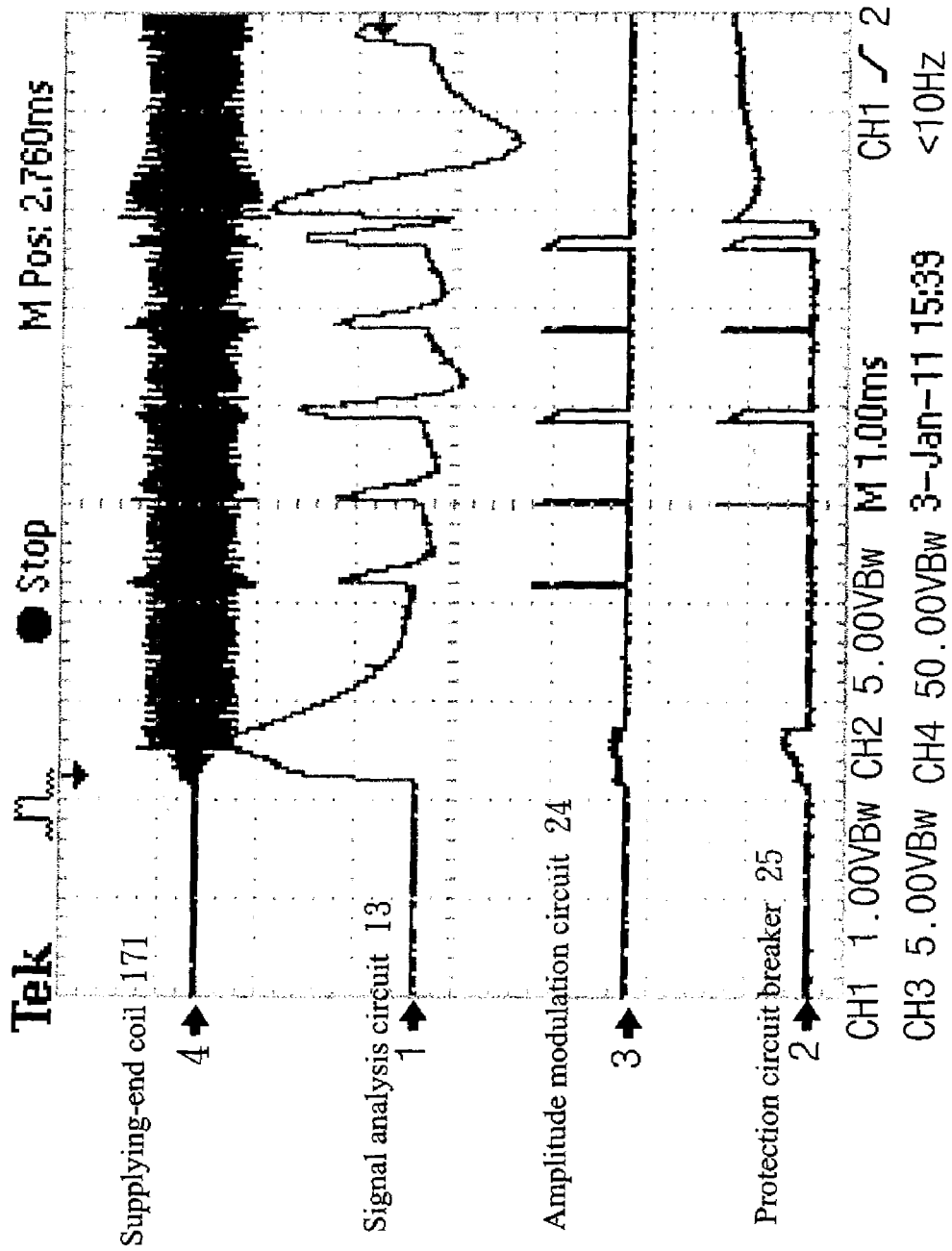
FIG. 13 illustrates one example of the data transmission operation according to the present invention.
Figure 14:
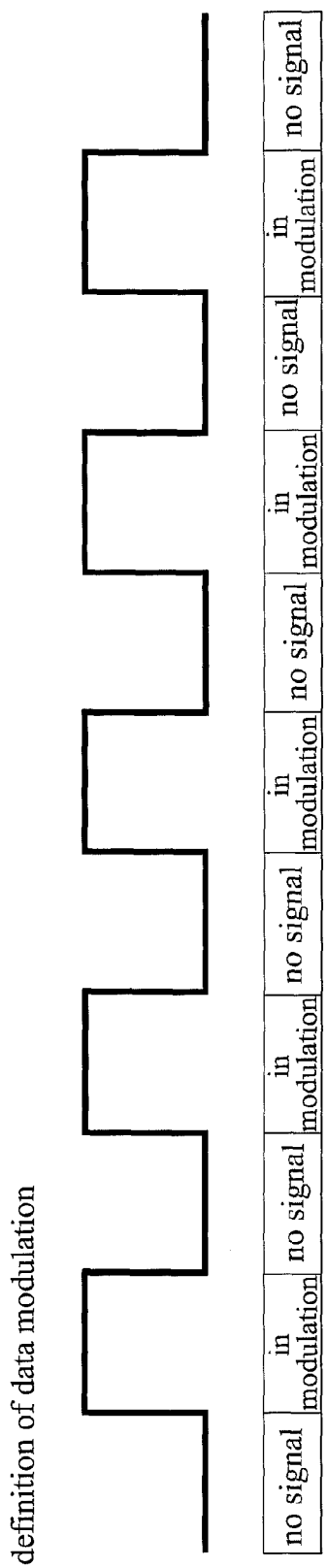
FIG. 14 illustrates the data transmission format in accordance with the present invention (I).
Figure 15:
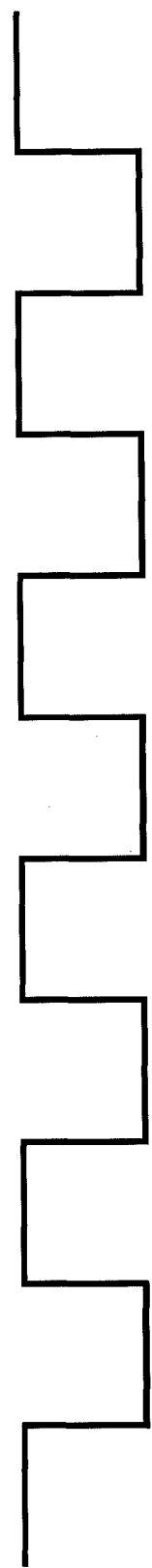
FIG. 15 illustrates the data transmission format in accordance with the present invention (II).

Further, by means of transmitting a short sensing signal, the supplying-end microprocessor 11 of the supplying-end module 1 can recognize the correctness of the data code of the data signal transmitted by the receiving-end module 2 (see FIG. 13). Further, the supplying-end microprocessor 11 and the receiving-end microprocessor 21 respectively initiate the arrangement of time series. By means of single bit data analysis, the supplying-end microprocessor 11 of the supplying-end module 1 keeps supplying power supply only after every bit has been recognized to be correct. On the contrary, the supplying-end microprocessor 11 of the supplying-end module 1 immediately stops supplying power supply when an incorrect signal is detected. By means of single bit data analysis to trigger the high-end MOSFET 122 or low-end MOSFET 123 of the power driver unit 12, the resonant circuit 17 is driven to oscillate and to further transmits power supply to the receiving-end module 2 through the supplying-end coil 171. During the standby mode, the supplying-end module 1 uses a short period of time to transmit a sensing signal, minimizing power consumption. Further, in conjunction with the functioning of the coil voltage detection circuit 14, modulation operation and ADC (analog-to-digital converter) are started up subject to a predetermined time series, assuring system operation stability.

Further, subject to the asymmetric data signal data encoding and decoding transmission format design of the high-power induction-type power supply system, the time in which the supplying-end microprocessor is in the modulation status is minimized, and therefore the time in which the supply of power supply to the receiving-end module 2 is interrupted is shortened. Further, the interval between each two modulation status is prolonged so that the buffer capacitor 261 of the voltage stabilizer circuit 26 of the receiving-end module 2 can be fully charged for enabling the power output terminal 263 to provide output power to the connected load. Thus, the invention enhances output power, assures data code transmission stability and reduces power loss during power transmission.

Further, when receiving a sensing signal from the supplying-end module 1, the receiving-end module 2 runs subject to the following steps:

(200) The receiving-end coil 281 of the receiving-end module 2 receives the sensing signal.

(201) The receiving-end microprocessor 21 of the receiving-end module 2 outputs a data code and keeps the protection circuit breaker 25 in the disconnected status.

(202) The protection circuit breaker 25 is electrically connected when the output data code is not modulated.

(203) The receiving-end microprocessor 21 detects whether or not it is the time to turn on the voltage stabilizer circuit 26 for output. And then, the receiving-end microprocessor 21 proceeds to step (204) when positive, or returns to step (202) when negative.

(204) The receiving-end microprocessor 21 turns on the voltage stabilizer circuit 26 to output power supply.

(205) The data code is not modulated, and the receiving-end microprocessor 21 turns on the protection circuit breaker 25 till that the receiving-end module 2 loses the electric energy of the induced power supply.

Further, subject to transmission of asymmetric data encoding and decoding format between the supplying-end module 1 and the receiving-end module 2, the time in which the supplying-end microprocessor is in the modulation status is minimized, and therefore the time in which the supply of power supply to the receiving-end module 2 is interrupted is shortened. Further, the interval between each two modulation status is prolonged so that the buffer capacitor 261 of the voltage stabilizer circuit 26 of the receiving-end module 2 can be fully charged for enabling the power output terminal 263 to provide output power to the connected load. Thus, the invention enhances output power, assures data code transmission stability and reduces power loss during power transmission.

Referring to FIGS. 14~18, when the amplitude modulation circuit 24 of the receiving-end module 2 modulated a data signal, the receiving-end coil 281 transmits the modulated data signal back to the supplying-end coil 171 of the supplying-end module 1, and then the signal analysis circuit 13 transmits the signal from the supplying-end coil 171 to the supplying-end microprocessor 11, enabling the supplying-end microprocessor 11 to analyzes the waveform of the signal. During transmission of induced power supply, no data signal is transmitted. When going to transmit a data signal, the receiving-end microprocessor 21 performs intermittent modulation, thereby transmitting the data code of the data signal.

As the circuit for transmitting power supply and the circuit for transmitting data signal are differently arranged, the waveform signal level, during modulation by the supplying-end microprocessor 11 in the reverse phase (see FIG. 15), is relatively lower than no signal status. This signal reverse phase has nothing to do with the signal recognition of the present invention. The power supply system of the present invention is to recognize the length of the modulated signal but not the signal level (see FIG. 17). Thus, in the following explanation, the invention adopts forward mode to recognize the length of the modulated signal. In actual practice, reverse phase can be adopted.

Figure 16:
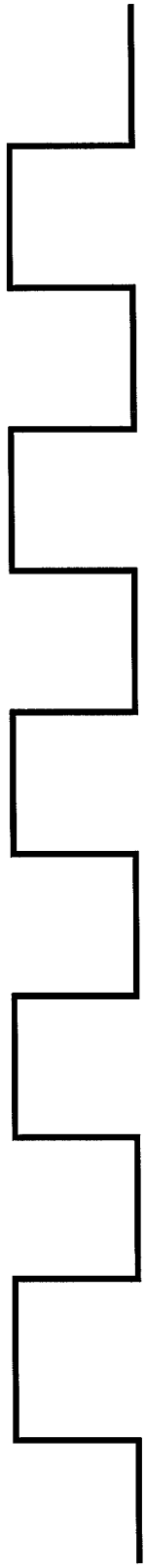
FIG. 16 illustrates the data transmission format in accordance with the present invention (III).
Figure 17:
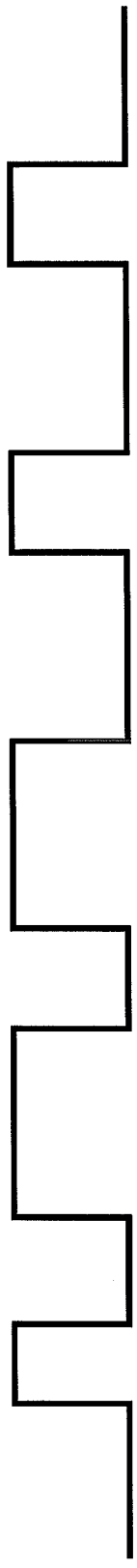
FIG. 17 illustrates the data transmission format in accordance with the present invention (IV).
Figure 18:
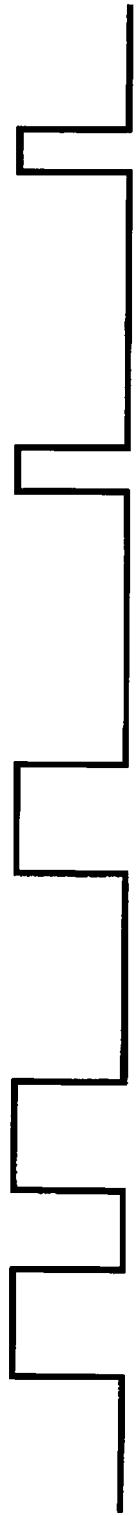
FIG. 18 illustrates the data transmission format in accordance with the present invention (V).

The data code of the data signal in accordance with the present invention is preferably defined to be an 8-bit data code (see FIG. 16). In actual application, the number of bits of the data code can be increased or reduced subject to the status of use and the user's need. The first signal is the start signal. After 8-bit data encoding, the signal at the last bit is the end signal. The serial format used has a high capacity of fault tolerance. Therefore, parity check is not requisite, and the invention allows different data encoding methods.

Further, subject to the asymmetric length data code (see FIG. 18), a relatively longer charging time of non-modulated status can be inserted in between two modulated signals when the receiving-end microprocessor 21 of the receiving-end module 2 is modulating a signal, thus, the invention lowers the possibility of power instability or interruption during signal transmission. The transmission of an asymmetric data code is defined to be 40 μS for the length of start, 120 μS for the length of logic [1] and 30 μS for the length of logic [0] when modulated, or 120 μS for the length of logic [1] and 800 μS for the length of logic [0] when not modulated. Under this arrangement, the length of charging time of non-modulated status between bit(2) and bit(4) is prolonged, enabling the buffer capacitor 261 of the receiving-end module 2 to be fully charged for power out in a stable manner. Further, the longest time in which the receiving-end module loses the supply of power supply is 120 μS for the length of logic [1] when modulated. When the supplying-end microprocessor 11 of the supplying-end module 1 performs signal analysis, the signal analysis circuit 13 requires a time to resume the level after each data signal modulation check. The analysis will be not possible if to put a short time length definition into each of the non-modulated status bits (1, 3, 5, 7). In the high-power induction-type power supply system, it requires a stable supply of power supply but not a high speed transmission ability. Therefore, data transmission length defined for a non-modulated status is extended, allowing transmission of power supply in a stable manner. By means of extending the non-modulated time length, signal level returns normal. When the supplying-end microprocessor 11 of the supplying-end module 1 performs signal analysis, the time length definition can be as sort as 30 μS without affecting signal analysis, and therefore data signal and power supply can be simultaneously transmitted.

Figure 21:
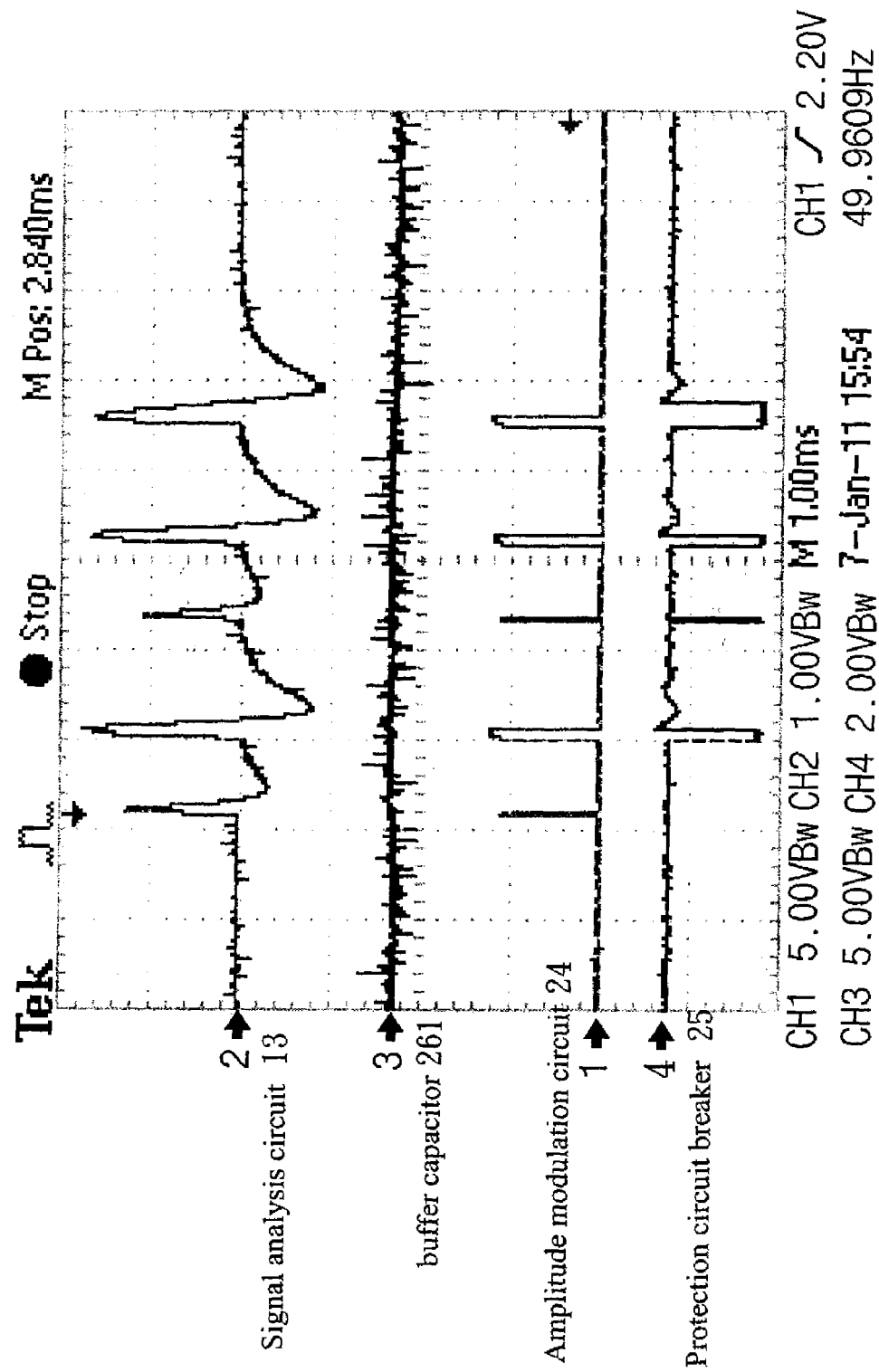
FIG. 21 illustrates one example of the power output operation of the receiving-end module according to the present invention.
Figure 22:
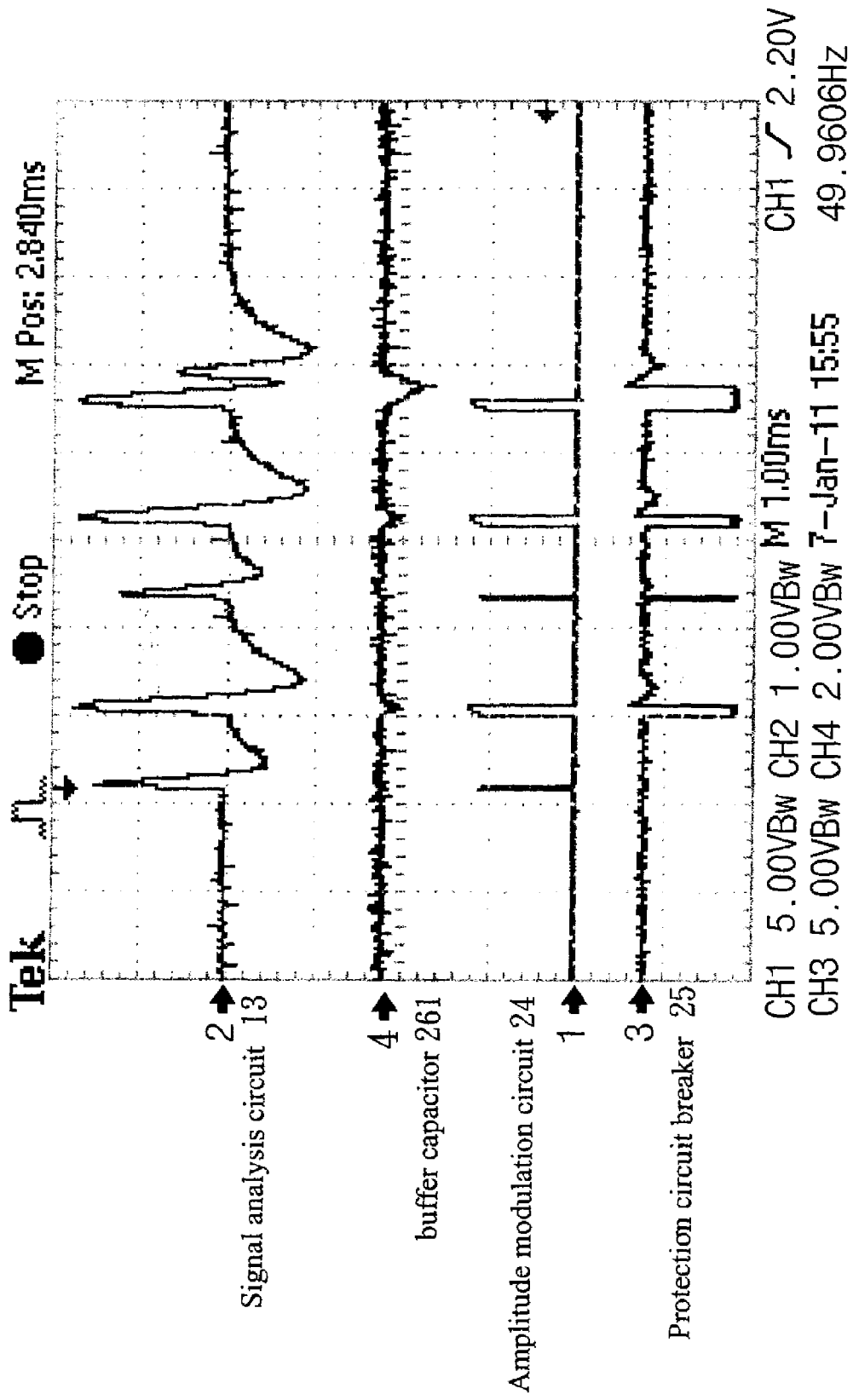
FIG. 22 illustrates another example of the power output operation of the receiving-end module according to the present invention.
Figure 23:
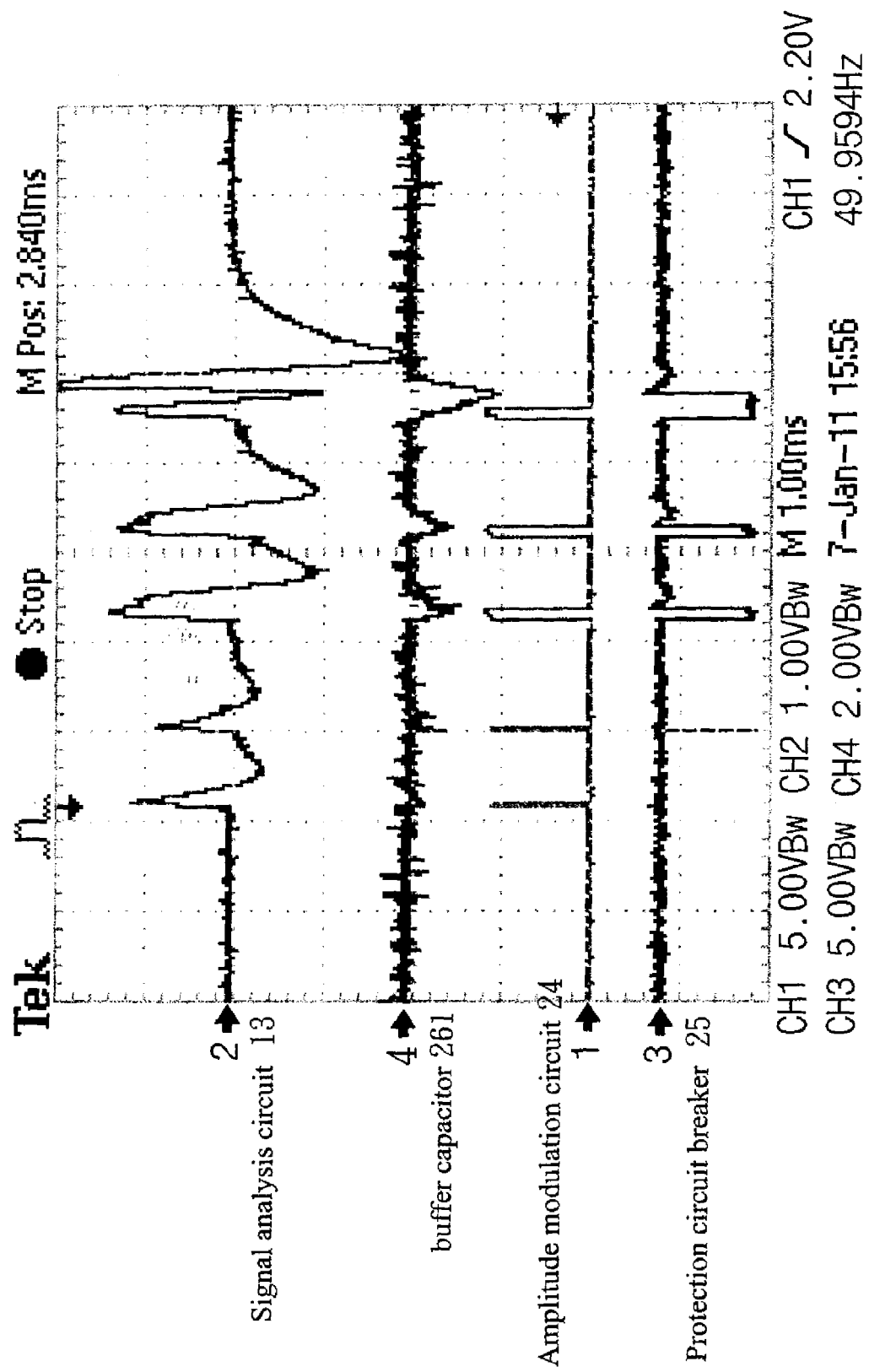
FIG. 23 illustrates still another example of the power output operation of the receiving-end module according to the present invention.

Referring to FIGS. 21, 22 and 23, in another application example of the present invention, subject to the performance of the protection circuit breaker 25, the power output terminal 263 of the receiving-end module 2 can output power supply to a different load, and signal transmission is maintained stable either during a high power output or low power output.

In this application example, during transmission of power supply (see FIG. 21), the amplitude modulation circuit 24 controlling the signal to be at high level means that signal modulation is under process; the protection circuit breaker 25 controlling the signal to be at high level means that the circuit is electrically connected.

When the receiving-end microprocessor 21 starts to transmit data, the start signal of the data signal enters modulation status, and the first start bit of the output is non-modulated. At this time, the power circuit of the protection circuit breaker 25 is maintained electrically connected. If the data bit signal of the following output is modulated, the protection circuit breaker 25 is switched off. When receiving-end microprocessor 21 changes the mode to transmit non-modulated bits, the protection circuit breaker 25 is switched on. When the transmission of the last data bit signal of the data signal is done, and the protection circuit breaker 25 will be switched on after a predetermined length of time delay, preventing data signal transmission failure due to increase of power factor of the power supply under transmission.

When the power output terminal 263 of the receiving-end module 2 outputs a non-load signal, as shown in FIG. 21, the voltage at the buffer capacitor 261 is stable. When the power output terminal 263 of the receiving-end module 2 outputs a low-load signal, as shown in FIG. 22, the voltage at the buffer capacitor 261 is slightly lowered due to interruption of power-receiving ability during signal modulation. After transmission of the last data bit, the protection circuit breaker 25 is switched on after a predetermined time delay, allowing the last data bit that is fed back to the signal analysis circuit 13 to be clearly recognized.

When the power output terminal 263 of the receiving-end module 2 outputs a high-load signal, as shown in FIG. 23, the voltage at the buffer capacitor 261 drops drastically during interruption of power receiving ability. Thus, any output condition of the power output terminal 263 does not interfere with signal transmission.

Figure 24:
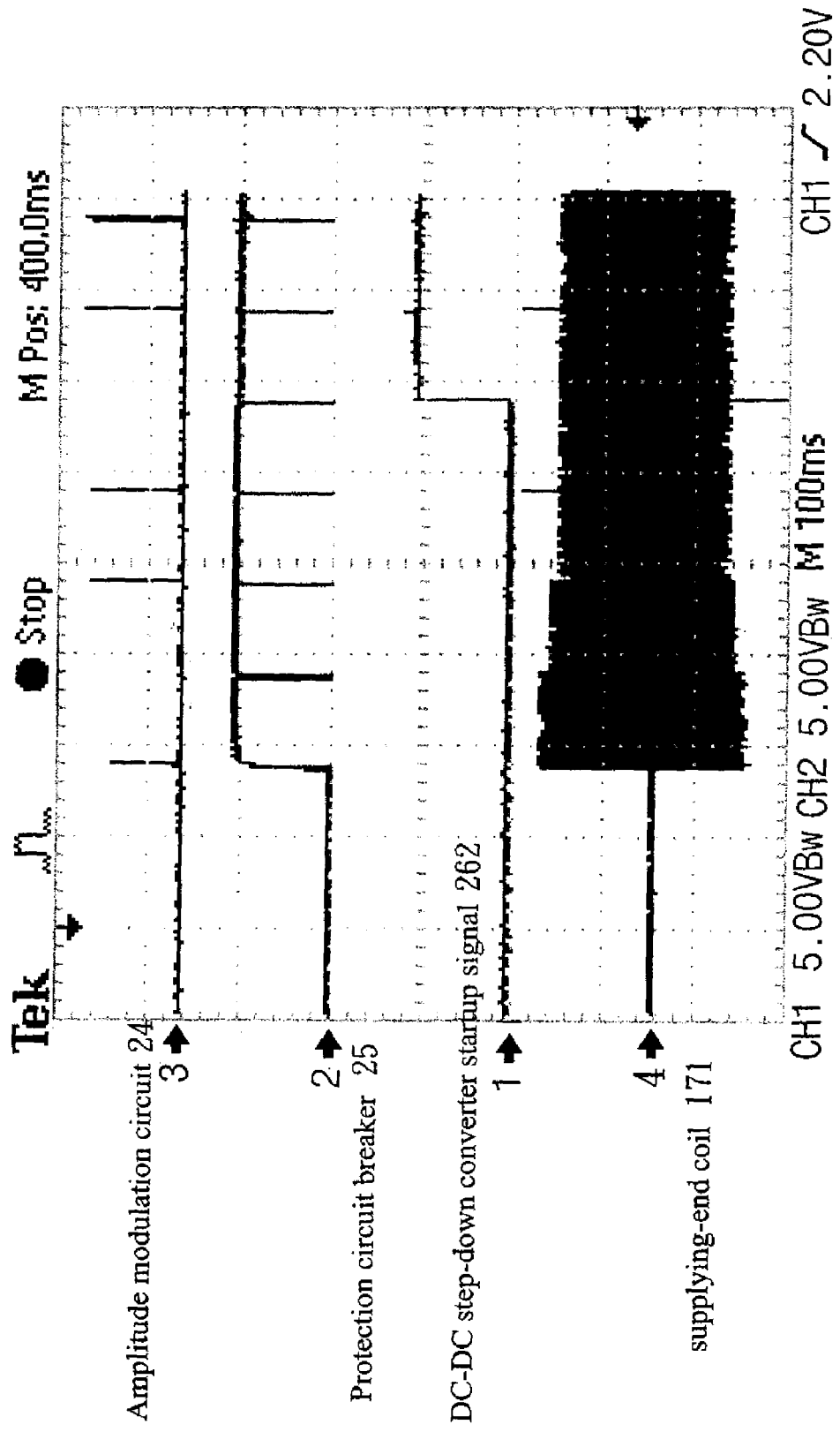
FIG. 24 illustrates still another example of the power output operation of the receiving-end module according to the present invention.

Referring to FIG. 24 and FIGS. 13, 19 and 20 again, when the receiving-end module 1 transmits data at the first time, the filter capacitor 232 of the rectifier and filter circuit 23 and the buffer capacitor 261 of the voltage stabilizer circuit 26 are not fully charged, the data code of the first data signal does not conduct the protection circuit breaker 25, so that sufficient feedback energy is provided for the transmission of the first data code. Further, after startup of induction, the initial bit outputs the complete data code to the supplying-end microprocessor 11 of the supplying-end module 1 within a short period of time for recognition, therefore sensing signal transmission time is minimized. When the supplying-end microprocessor 11 senses a feedback start signal from the receiving-end module 2, it continues energy transmission for the transmission of the next bit data. If there is a data code not recognizable during this stage, the supplying-end microprocessor 11 will immediately end the data code analysis program and turn off the output, minimizing the power consumption of the supplying-end module 1 during the standby mode. Therefore, the supplying-end module 1 does not deliver power supply when the target object is not recognized.

Figure 19:
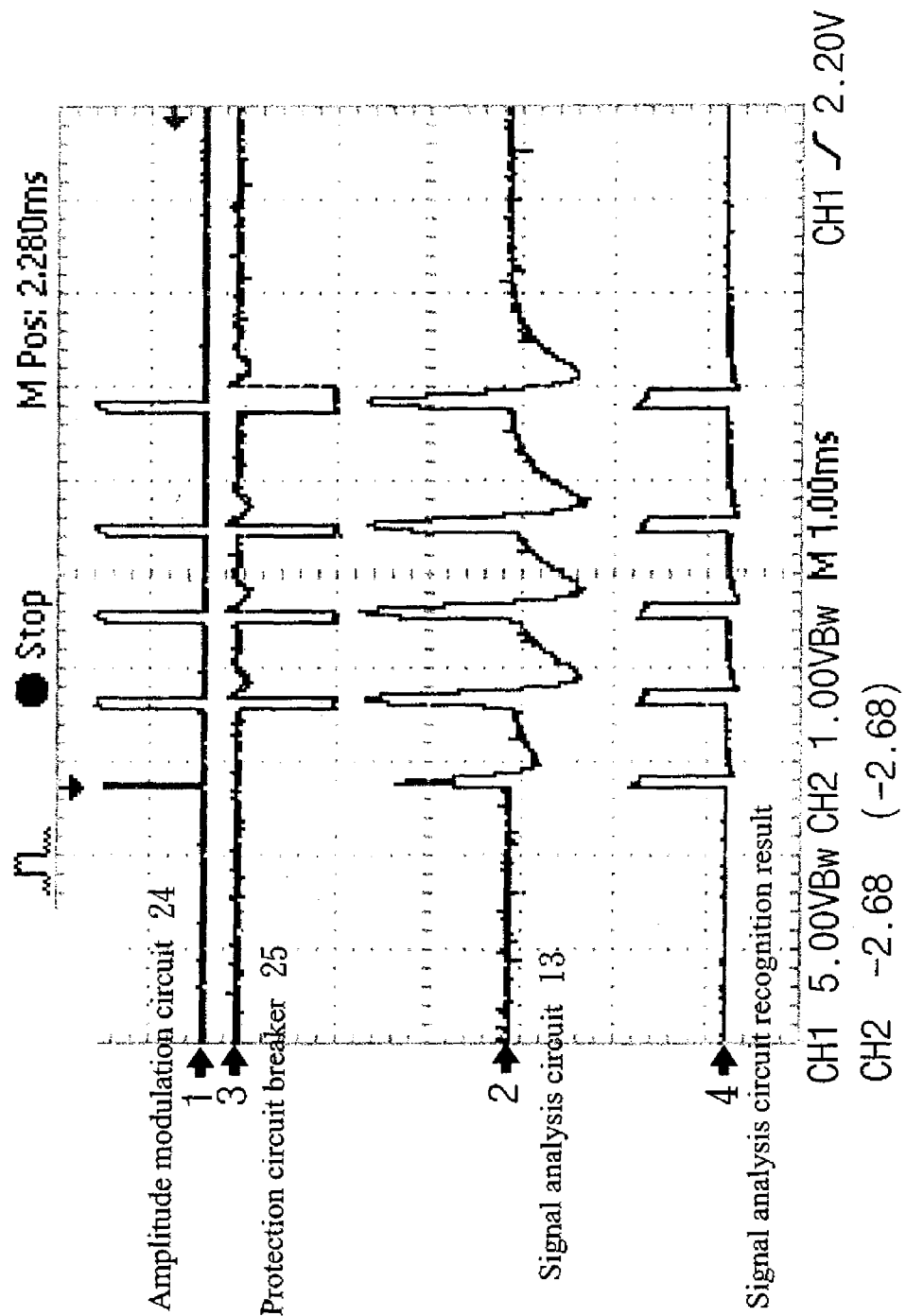
FIG. 19 illustrates another example of the data transmission operation according to the present invention.
Figure 20:
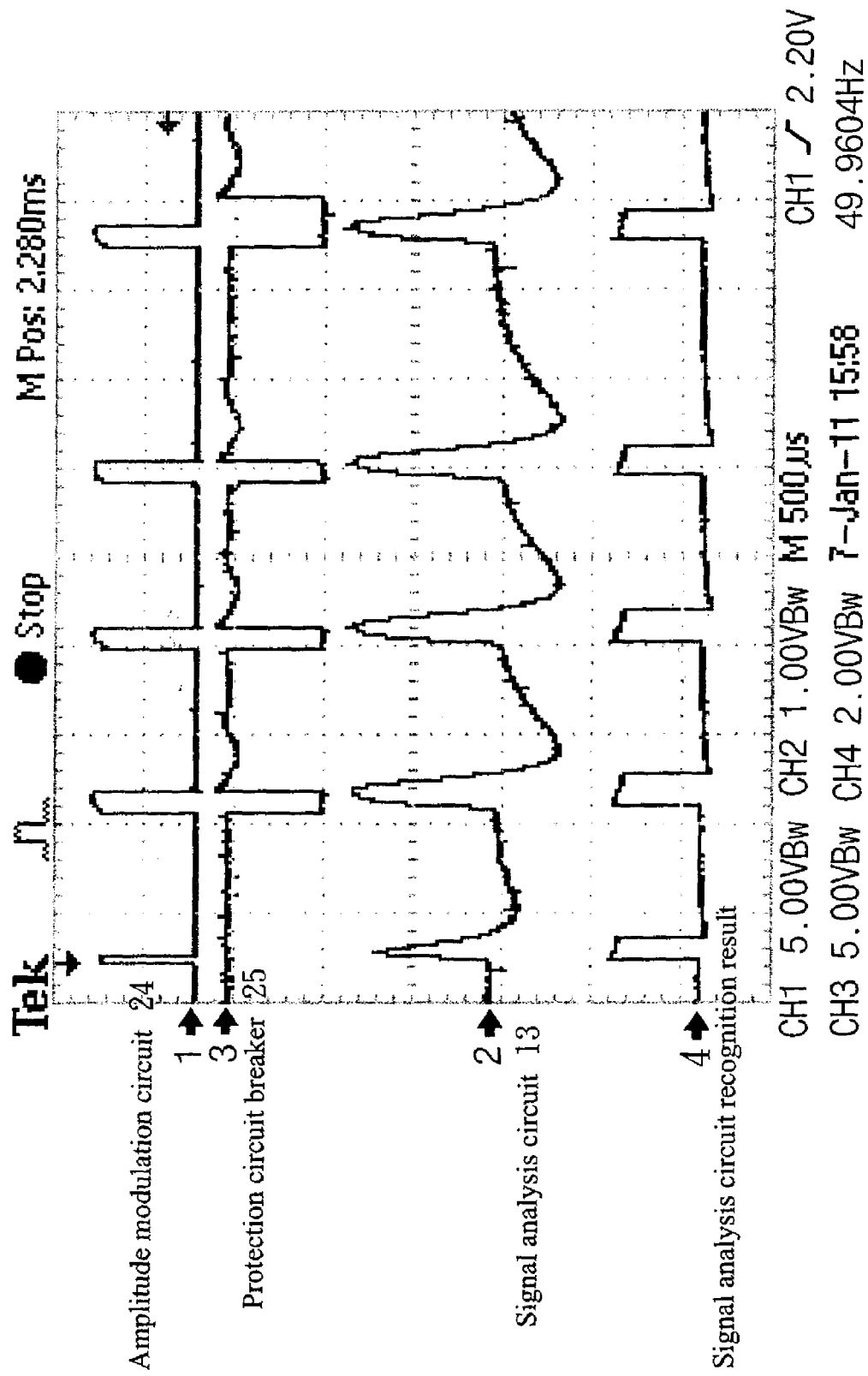
FIG. 20 illustrates still another example of the data transmission operation according to the present invention.

Referring to FIG. 13 again, when the receiving-end module 2 is started up, the protection circuit breaker 25 is conducted after output of the first data code by the amplitude modulation circuit 24 of the receiving-end module 2, enabling the buffer capacitor 261 of the voltage stabilizer circuit 26 to be charged (see also FIGS. 19 and 20).

Further, when the power of the buffer capacitor 261 of the voltage stabilizer circuit 26 of the receiving-end module 2 rises subject to power output, the capacity arrangement must be relatively increased so that sufficient buffer can be provided for the posterior power output. When raising the capacity of the buffer capacitor 261, the charging time of the buffer capacitor 261 will be relatively increased. Therefore, when starting to charge the buffer capacitor 261, a certain length of waiting time is necessary for enabling the buffer capacitor 261 to be fully charged. After charging, the voltage stabilizer circuit 26 is electrically conducted for enabling the receiving-end module 2 to start power output. When the supplying-end coil 171 starts to transmit power supply, as shown in FIG. 24, the protection circuit breaker 25 is electrically conducted for enabling the receiving-end module 2 to be charged, and the voltage stabilizer circuit 26 will be conducted to provide power supply after 500 mS.

It is to be understood that the above description simply explains one embodiment of the present invention, which shall not be used as limitations of the invention. According to the data transmission method of the present invention, the supplying-end microprocessor 11 of the supplying-end module 1 senses a data signal transmitted by the receiving-end module 2; the receiving-end microprocessor 21 of the receiving-end module 2 is respectively electrically coupled with the amplitude modulation circuit 24, the protection circuit breaker 25 and the voltage stabilizer circuit 26 to control stable transmission of data signal subject to arrangement of time series. Further, subject to the performance of the built-in data code analysis software of the supplying-end microprocessor 11 of the supplying-end module 1, the data code of the data signal is transmitted stably during transmission of power supply, minimizing power loss. Thus, variation of electric current at the load end of the receiving-end module 2 does not affect the data code analysis and transmission operation of the supplying-end microprocessor 11. As the power conversion circuit and data signal transmission circuit of the receiving-end module 2 are separately arranged for independent operation, the maximum transmission power of the high-power induction-type power supply system is enhanced. Subject to transmission of asymmetric data encoding and decoding format between the supplying-end module 1 and the receiving-end module 2, the invention achieves synchronous charging and stabilized data signal transmission.

In conclusion, the high-power induction-type power supply system and its data transmission method of the present invention has the features and advantages as follows:

1. The supplying-end microprocessor 11 of the supplying-end module 1 has built-in data code analysis software that is capable of analyzing the data code of the data signal provided by the receiving-end module 2 without affecting the operation of the supplying-end microprocessor 11 in supplying power supply so that power loss is minimized during transmission of power supply.
2. The receiving-end microprocessor 21 of the receiving-end module 2 is respectively electrically coupled with the amplitude modulation circuit 24, the protection circuit breaker 25 and the voltage stabilizer circuit 26 to control stable transmission of data signal subject to arrangement of time series so that the supplying-end microprocessor 11 of the supplying-end module 1 can recognize the data code of the received data signal to be correct or incorrect within a short period of time; by means of single bit data analysis to start up power supply, only a short period of time is used for transmitting a sensing signal when the supplying-end module 1 is in the standby mode, and therefore standby power consumption of the supplying-end module 1 is minimized.
3. By means of the coil the supplying-end microprocessor 11 of the supplying-end module 1 voltage detection circuit 14, starts up the ADC (analog-to-digital converter) to match with the time series of frequency modulation, assuring operation stability of the high-power induction-type power supply system.
4. Subject to the asymmetric data signal data encoding and decoding transmission format design of the high-power induction-type power supply system, the supplying-end microprocessor 11 of the supplying-end module 1 enables the time in which the data signal is modulated to be greatly shortened, so that the time in which the supply of power supply to the receiving-end module 2 is interrupted is shortened; by means of prolonging the interval between each two modulation status, the buffer capacitor 261 of the voltage stabilizer circuit 26 of the receiving-end module 2 can be fully charged for enabling the power output terminal 263 to provide enhanced output power to the connected load, and therefore data code transmission is stabilized and power loss during transmission of power supply is minimized.

A prototype of high-power induction-type power supply system and its data transmission method has been constructed with the features of FIGS. 1~24. The high-power induction-type power supply system and its data transmission method works smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A data transmission method used in a high-power induction-type power supply system consisting of a supplying-end module and a receiving-end module, comprising the steps of:
    (a) standby time is up, start to transmit a sensing signal;
    (b) transmit a predetermined main operation frequency to a register;
    (c) coil voltage detection circuit that is electrically connected to the supplying-end microprocessor of the supplying-end module starts up ADC (analog-to-digital converter) mode;
    (d) start to output system defined maximum operating frequency to the power driver that is electrically connected to the supplying-end microprocessor;
    (e) lower the operating frequency;
    (f) determine whether or not the current operating frequency is equal to the set value of the main operating frequency, and then return to step (e) when negative, or proceed to step (g) when positive;
    (g) end frequency modulation output, start to sense signal;
    (h) check whether or not the signal analysis circuit receives a data signal, and then proceed to step (i) when positive, or step (j) when negative;
    (i) data code inspection software checks the data code to be recognizable or not, and then provide power supply to the receiving-end module when positive, or proceed to step (i) when negative;
    (j) no data is sensed, the coil voltage detection circuit starts up the ADC (analog-to-digital converter) for data conversion;
    (k) the sensing signal is ended; turn off the output to the supplying-end module;
    (l) use the ADC (analog-to-digital converter) data of the coil voltage detection circuit to set the operating frequency and the adjust the output power of the sensing signal; and (m) enter the standby mode, and start to count time until next startup.

2. The data transmission method as claimed in claim 1, wherein the step (h) to check whether or not the signal analysis circuit receives a data signal is performed subject to the following sub-steps:
- (h00) prepare to start data transmission;
- (h01) define data signal lengths, including modulated length of logic [1], non-modulated length of logic [1], modulated length of logic [0] and non-modulated length of logic [0];
- (h02) enter the modulation condition and then start to count the data of the start signal;
- (h03) counting time is up, change the mode to start modulate;
- (h04) send out the data to be transmitted, and then checks from the MSB (most significant bit), the logic signal to be sent is [0] or [1], and then proceed to step (h05) if it is [0], or step (h06) if it is [1];
- (h05) judge the status of the logic [0], and then proceed to step (h051) if in modulation, or step (h052) if not in modulation;
- (h051) count the modulated length of logic [0], and then turn off the circuit, and then proceed to step (h07);
- (h052) count the non-modulated length of logic [1, and then conduct the switching circuit, and then proceed to step (h07);
- (h06) judge the status of logic [1], and then proceed to step (h061) if in modulation, or step (h062) if not in modulation;
- (h061) count the modulated length of logic [1], and then turn off the circuit, and then proceed to step (h07);
- (h062) count the non-modulated length of logic [1], and then turn on the circuit, and then proceed to step (h07);
- (h07) check transmission of the data to be transmitted, and then proceed to step (h08) when transmission is not finished yet, or step (h09) when transmission is finished;
- (h08) transmission is not finished, thus prepare transmission of the next bit, and then return to step (h06);
- (h09) transmission is finished, enter delay counting;
- (h10) conduct the protection circuit breaker; and
- (h11) end the data signal transmission procedure.

3. The data transmission method as claimed in claim 1, wherein the data code inspection step (i) is performed subject to the following sub-steps:
- (i00) start up data code inspection program;
- (i01) check whether or not the data signal contains a start signal, and then, proceed to step (i02) when negative, or step (i05) when positive;
- (i02) check whether or not the data signal is the length of start, and then, proceed to step (i03) when positive, or step (i04) when negative;
- (i03) the data signal is the length of start, mark start signal, and then proceed to step (i05);
- (i04) data signal is unrecognizable, and then prepare to turn off the output;
- (i05) prepares to receive a next bit, and wait for state transition triggering;
- (i06) state transition is triggered, stop counting, and judge the status of the current data signal, and then proceed to step (i07) if the data signal is in modulation, or step (i08) if the data signal is not in modulation;
- (i07) the signal is modulated, check it is in conformity with the modulated length of logic [1] or [0], and then proceed to step (i09) when positive, or return to step (i04) when negative;
- (i08) the signal is not modulated, check it is in conformity with the non-modulated length of logic [1] or [0], and then proceed to step (i09) when positive, or return to step (i04) when negative;
- (i09) data signal is in conformity with the defined length, and then fill the corresponding logic code into the receiving-end memory;
- (i10) check whether or not the assigned number of bits has been received, and then, proceed to step (i11) when positive, or return to step (i05) when negative;
- (i11) received the data code, check the format to be correct or not and then, proceed to step (i12) when correct, or return to step (i04) when not correct; and
- (i12) the format is correct; enter the power supplying mode to execute normal power supply supplying operation.

4. The data transmission method as claimed in claim 1, wherein said supplying-end module comprises a supplying-end microprocessor having installed therein an operation/control/data decoding and analysis-related software program, a power driver electrically coupled to said supplying-end microprocessor, a signal analysis circuit electrically coupled to said supplying-end microprocessor, a coil voltage detection circuit electrically coupled to said supplying-end microprocessor, a display unit electrically coupled to said supplying-end microprocessor, a power supplying unit electrically coupled to said supplying-end microprocessor, a supplying-end resonant circuit electrically coupled to said power driver and a supplying-end coil electrically coupled to said supplying-end resonant circuit and adapted for transmitting power supply and data signal wirelessly.

5. The data transmission method as claimed in claim 1, wherein said receiving-end module comprises a receiving-end microprocessor having installed therein an operation/control-related software program, a voltage detection circuit electrically coupled to said receiving-end module, a rectifier and filter circuit t electrically coupled to said receiving-end module, an amplitude modulation circuit electrically coupled to said receiving-end module, a protection circuit breaker electrically coupled to said receiving-end module, a voltage stabilizer circuit electrically coupled to said receiving-end module, a DC-DC buck converter electrically coupled to said receiving-end module, a resonant circuit and a receiving-end coil electrically coupled to said receiving-end resonant circuit, said receiving-end resonant circuit and said receiving-end coil being electrically connected in parallel to said rectifier and filter circuit and electrically connected with said amplitude modulation circuit in series, said voltage detection circuit, said protection circuit breaker, said voltage stabilizer circuit and said DC-DC buck converter being respectively electrically coupled with said rectifier and filter circuit, said rectifier and filter circuit and said amplitude modulation circuit being respectively electrically coupled with said receiving-end resonant circuit.

6. A high-power induction-type power supply system consisting of a supplying-end module and a receiving-end module, wherein:
said supplying-end module comprises a supplying-end microprocessor having installed therein an operation/control/data decoding and analysis-related software program, a power driver, a signal analysis circuit, a coil voltage detection circuit, a display unit, a power supplying unit, a supplying-end resonant circuit and a supplying-end coil, said power driver unit, said signal analyzer, said coil voltage detection circuit, said display unit and said power supplying unit being respectively electrically coupled to said supplying-end microprocessor, said supplying-end coil being electrically coupled with said resonant circuit and adapted for transmitting power supply and data signal wirelessly;

said receiving-end module comprises a receiving-end microprocessor having installed therein an operation/control-related software program, a voltage detection circuit, a rectifier and filter circuit, an amplitude modulation circuit, a protection circuit breaker, a voltage stabilizer circuit, a DC-DC buck converter, a receiving-end resonant circuit and a receiving-end coil, said voltage detection circuit, said rectifier and filter circuit, said amplitude modulation circuit, said protection circuit breaker, said voltage stabilizer circuit and said DC-DC buck converter being respectively electrically coupled with said receiving-end microprocessor, said rectifier and filter circuit, said protection circuit breaker and said DC-DC buck converter being electrically connected in series, said receiving-end resonant circuit and said receiving-end coil being electrically connected in parallel to said rectifier and filter circuit\and electrically connected with said amplitude modulation circuit in series, said voltage detection circuit, said protection circuit breaker, said voltage stabilizer circuit and said DC-DC buck converter being respectively electrically coupled with said rectifier and filter circuit, said rectifier and filter circuit and said amplitude modulation circuit being respectively electrically coupled with said receiving-end resonant circuit, which is electrically coupled with said receiving-end coil.

7. The high-power induction-type power supply system as claimed in claim 6, wherein said power driver unit comprises a MOSFET (Metal-Oxide-Semiconductor Field-Effect Transistor) driver, a high-end MOSFET component and a low-end MOSFET component, said MOSFET driver being electrically coupled with said supplying-end microprocessor, said high-end MOSFET component and said low-end MOSFET component, said high-end MOSFET component and said low-end MOSFET component being respectively electrically coupled with said supplying-end resonant circuit, said high-end MOSFET component being electrically coupled with said power supplying unit and said supplying-end resonant circuit.

8. The high-power induction-type power supply system as claimed in claim 6, wherein said power supplying unit of said supplying-end module comprises a power source, and two current sensing shunt resistors electrically connected in series to said power source.

9. The high-power induction-type power supply system as claimed in claim 6, wherein said display unit of said supplying-end module is selected from the group of liquid crystal display screen, LED display screen and cold light display screen.

10. The high-power induction-type power supply system as claimed in claim 6, wherein said voltage detection circuit comprises a plurality of resistors electrically connected in series to said supplying-end microprocessor, and a plurality of sensing points electrically connected with the resistors, said rectifier and filter circuit, said protection circuit breaker and said DC-DC buck converter.

11. The high-power induction-type power supply system as claimed in claim 6, wherein said rectifier and filter circuit comprises a rectifier and a filter capacitor respectively electrically connected in parallel to said voltage detection circuit, said protection circuit breaker and said DC-DC buck converter.

12. The high-power induction-type power supply system as claimed in claim 6, wherein said amplitude modulation circuit comprises an inductor, a rectifying diode and a MOSFET component electrically connected in series.

13. The high-power induction-type power supply system as claimed in claim 6, wherein said protection circuit breaker comprises a resistor, a P-type MOSFET component and an N-type MOSFET component, the resistor, P-type MOSFET component and N-type MOSFET component of said protection circuit breaker being electrically connected in series, said N-type MOSFET component being electrically coupled with said receiving-end microprocessor.

14. The high-power induction-type power supply system as claimed in claim 6, wherein said voltage stabilizer circuit comprises a buffer capacitor, a DC-DC step-down converter and a power output terminal, the buffer capacitor and DC-DC step-down converter of said voltage stabilizer circuit being electrically coupled to said protection circuit breaker.

* * * * *